US009165430B2

(12) United States Patent
Bickley

(10) Patent No.: US 9,165,430 B2
(45) **Date of Patent: *Oct. 20, 2015**

(54) MANAGED ON-LINE POKER TOURNAMENTS

(71) Applicant: IGT, Las Vegas, NV (US)

(72) Inventor: J. Scott Bickley, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/015,413

(22) Filed: Aug. 30, 2013

(65) Prior Publication Data

US 2014/0094296 A1 Apr. 3, 2014

Related U.S. Application Data

(63) Continuation of application No. 13/323,487, filed on Dec. 12, 2011, now Pat. No. 8,523,682, which is a continuation of application No. 12/609,872, filed on Oct. 30, 2009, now Pat. No. 8,092,309.

(51) Int. Cl.
*G07F 17/32* (2006.01)
*A63F 13/12* (2006.01)

(52) U.S. Cl.
CPC ............ *G07F 17/3276* (2013.01); *G07F 17/32* (2013.01); *G07F 17/3223* (2013.01)

(58) Field of Classification Search
USPC ...................................................... 463/29, 42
See application file for complete search history.

(56) References Cited

U.S. PATENT DOCUMENTS

| | | | | |
|---|---|---|---|---|
| 5,823,879 | A | 10/1998 | Goldberg et al. | |
| 6,264,560 | B1 | 7/2001 | Goldberg et al. | |
| 6,908,390 | B2 | 6/2005 | Nguyen et al. | |
| 2005/0148377 | A1 | 7/2005 | Goldberg et al. | |
| 2005/0176498 | A1* | 8/2005 | Nguyen | 463/25 |
| 2006/0082056 | A1 | 4/2006 | Kane et al. | |
| 2009/0124364 | A1* | 5/2009 | Cuddy et al. | 463/27 |
| 2009/0176565 | A1* | 7/2009 | Kelly | 463/29 |
| 2009/0191955 | A1* | 7/2009 | Seelig et al. | 463/25 |
| 2010/0120486 | A1* | 5/2010 | DeWaal et al. | 463/16 |
| 2011/0059784 | A1* | 3/2011 | Lutnick et al. | 463/16 |
| 2011/0065490 | A1* | 3/2011 | Lutnick | 463/16 |
| 2011/0105208 | A1 | 5/2011 | Bickley | |

* cited by examiner

*Primary Examiner* — Pierre E Elisca
(74) *Attorney, Agent, or Firm* — Neal, Gerber & Eisenberg LLP

(57) ABSTRACT

A method in a gaming system is described herein. The gaming system includes at least one server having a memory, a network interface, and a processor. The method includes generating a plurality of games. The method further includes determining whether a game is available for play at a first gaming device, including: (a) selecting a first game from the plurality of games, (b) selecting a second gaming device currently granted access to the first game, (c) determining first location information associated with the first gaming device and second location information associated with the second gaming device, (d) determining whether the first game is available for play at the first gaming device, and (e) repeating b), c) and d), for a first group of gaming devices. The method includes sending a message to the first gaming device including information regarding the games available for play at the first gaming device.

27 Claims, 9 Drawing Sheets

MANAGED ON-LINE POKER TOURNAMENTS

PRIORITY DATA

This application is a continuation of and claims priority under 35 U.S.C. 120 to co-pending and commonly assigned U.S. patent application Ser. No. 13/323,487, entitled "MANAGED ON-LINE POKER TOURNAMENTS," filed on Dec. 12, 2011, which is a continuation of U.S. patent application Ser. No. 12/609,872, entitled "MANAGED ON-LINE POKER TOURNAMENTS," filed on Oct. 30, 2009, which granted as U.S. Pat. No. 8,092,309, both of which are hereby incorporated by reference in their entireties for all purposes.

COPYRIGHT NOTICE

A portion of the invention of this patent document contains or may contain material which is subject to copyright protection. The copyright owner has no objection to the photocopy reproduction by anyone of the patent document or the patent invention in exactly the form it appears in the Patent and Trademark Office patent file or records, but otherwise reserves all copyright rights whatsoever.

TECHNICAL FIELD

The present invention relates generally to gaming devices and systems, and more specifically to head-head poker on a gaming machine.

BACKGROUND

Competitive poker where players play poker games against one another has grown in popularity in recent years. One aspect of the popularity of competitive poker is poker tournaments. Poker tournaments are a type of tournament that allows players to participate in a poker game as part of the tournament. Players are often required to play the same game to ensure parity among the tournament. In some instances, players may be allowed to play different games and a mathematical factor is applied to the outcome to balance the results.

Often these poker tournaments take place at a venue, such as a casino, where all of the players physically gather together to participate. At the venue, the players are manually registered. Then, the progress of the tournament is manually monitored and status of various players is manually posted, such as chip totals. These types of tournaments can be multi-day events.

Another method of providing a poker tournament that is gaining in popularity is Internet-based poker tournaments. Internet based poker tournaments are organized and played utilizing home computers and web-browsers. These tournaments allow geographically disparate players to participate in poker tournaments without having to travel to a particular venue.

Besides tournaments, players may simple wish to play poker games, such as Texas hold'em, against other players. Most casinos offer poker areas and organize games where players can participate against one another in this manner. Also, players can play against one another in poker games in an on-line manner via a number of Internet based poker sites.

The importance of being able to read a player, such as determining whether they are bluffing or not, based-upon emotional and physical queues is a much more important factor in games where player's play each other in person versus games where player's are physically separate and are playing each other online in a virtual playing area. To some players, in particular casual or inexperienced players, playing in person, can be quite intimidating. Further, organized in-person play at a venue, such as a casino, can be both time consuming and costly because of the travel time/costs for the player and the labor and maintenance costs associated with maintaining a venue and organizing games born by the operator of the casino. As a result, lower betting limits may be associated with on-line poker games versus brick and mortar establishments. Thus, for these reasons, many poker players, especially casual or inexperienced players prefer network-based poker games.

One disadvantage of on-line poker is that in many locations it is illegal and there are legal limitations that make it difficult to transfer funds to and from such sites. Further, these sites are not regulated and their have been known instances of cheating including revealing players cards to another player or collusion among players. In addition, a player may not even be sure that they are actual playing against person. For instance, poker bots have been developed to participate in on-line poker games without the participation of an actual person. Further, some players may have access to betting or other analysis programs that give than an advantage over other players. These disadvantages discourage many players in participating in on-line poker. In view of the above it would be desirable to provide gaming apparatus and methods that overcome these disadvantages associated with on-line poker.

SUMMARY

The present invention addresses the need described above by providing a gaming system configured to provide on-line poker games with only live participants. In one embodiment, the gaming system may be provided in a gaming venue associated with a casino or across a gaming enterprise. The gaming system may comprise a number of secure transaction terminals that are distributed throughout the gaming venue or the gaming enterprise.

The secure transaction terminals may be gaming devices that are designed for operation only by a human operator. The secure transaction terminals may include one or more of mobile devices that may be moved throughout the gaming venue or a gaming enterprise, thin-client gaming devices with fixed locations and wager-based video gaming machines with fixed locations. The gaming system may include one or more servers configured to provide head-to-head poker games involving live players, monitor the locations of the secure transaction terminals and limit game participation based upon the locations of the secure transaction terminals being utilized in the gaming venue. The game participation based upon location may be performed to prevent collusion among players. In other embodiments, access to the head-to-head poker games may be provided to players wishing to participate from a remote location, such as a via the player's home computer.

A first aspect of the invention described herein relate to a gaming system. The gaming system may comprise at least one server and a plurality of gaming devices. The at least one server may comprise a processor coupled to a memory and a network interface for communicating with the plurality of gaming devices. The processor may be designed or configured to 1) generate a plurality of poker games each poker game including game play between two or more different players; 2) determine whether one or more of the plurality of poker games is available for play from a first gaming device in the plurality of gaming devices and 3) send a message to the first gaming device including information regarding one or more of the plurality of poker games available for play at the first gaming device The availability determination for each of the plurality of poker games may comprising a) selecting a first poker game from among the plurality of poker games, b) selecting a second gaming device from among a first group of gaming devices currently granted access to the first poker game, c) determining first location information associated with the first gaming device and second location information associated with the second gaming device; d) based upon the first location information and the second location information, determining whether the first poker game is available for play from the first gaming device; and e) repeating b), c) and d), for each of the first group of gaming devices currently granted access to the first poker game.

The plurality of gaming devices may be configured for playing the plurality of poker games. Each of the plurality of gaming devices may comprise; 1) a video display for displaying the one or more of the plurality of poker games available for play at the first gaming device; 2) one or more input mechanisms for selecting from the one or more of the plurality of poker games available for play and for making game playing decisions associated with a play of the selected one or more plurality of poker games available for play where the one or more input mechanisms may be designed or configured for human actuation; 3) a cabinet designed or configured to secure the video display and the one or more input mechanisms and to prevent access by a player to hardware, firmware or software associated with each of the plurality of gaming devices; and 4) a communication interface for communication with the at least one server.

In particular embodiments, the first gaming device or the second gaming device may be a mobile gaming device. One or more of the plurality of gaming devices may include a first input mechanism for receiving cash or an indicia of credit and one or more of the plurality of gaming devices may include a first output mechanism for outputting cash or an indicia of credit. One or more of the plurality of gaming devices may be designed or configured for simultaneous play of two or more of the plurality of poker game or for simultaneous play of one of the plurality of poker games including game play between two or more different players and a wager-based game involving only a single player. One or more of the plurality of poker games may be associated with a poker tournament.

In other embodiments, the processor may be further designed or configured to receive from the first gaming device, information regarding a second poker game selected from the plurality of poker games available for play at the first gaming device and in response to receiving the selection of the second poker game, grant access to the second poker game from the first gaming device. The processor may be further designed of configured in response to granting access to the second poker game from the first gaming device, to update a list of poker games available for play at one or more other gaming devices separate from the first gaming device. In addition, the processor may be further designed or configured to determine an order in which to update the list poker games available for play on the one or more other gaming devices wherein the order is based upon a distance between first gaming device and each of the one or more other gaming devices. Also, the processor may be further designed or configured in response to granting access to the second poker game from the first gaming device, to determine whether to update the list of poker games available for play on one or more other gaming devices separate from the first gaming device based upon a distance between first gaming device and each of the one or more other gaming devices.

In yet other embodiments, the processor may be further designed or configured to output to a video display coupled to the at least one server a map of a gaming establishment, said map including elements representative of objects present in the gaming establishment. Also, the processor may be designed or configured to determine a first location of the first gaming device on the map of the gaming establishment and output an indicator of the first gaming device on the map. Further, the processor may be designed or configured to determine a number of gaming devices in the plurality of gaming devices from which the first poker game is being played, for each of the number of gaming devices determine a location associated with each of the number of gaming devices on a map of the gaming establishment, and to output to a video display the map of the gaming establishment including an indicator of the location associated with each of the number of gaming devices and information associated with parameters of the first poker game.

In yet further embodiments, the processor may be designed or configured to determine, based on the first location information and the second location information, a distance between the first gaming device and the second gaming device and based upon the distance between the first gaming device and the second gaming device, determine whether the game is available for play on the first gaming device. In addition, the processor may be designed or configured to determine a first location of the first gaming device relative to locations of one or more other of the plurality of gaming devices. Further, the processor may be further designed or configured to continuously update a list of the plurality of poker games available for play at the first gaming device or the second gaming device.

In particular embodiments, the first gaming device may be a mobile gaming device and the processor may be designed or configured to determine a first location of the first gaming device and to determine a first number of games available for play at the first location. In addition, the processor may be designed or configured to determine the first gaming device is at a second location different from the first location and to determine a second number of games different from the number of games available for play at the first location. Also, the first gaming device may be a mobile device granted access by the at least one server to provide play of a second poker game while the first gaming device is proximate to a first location where the processor may be designed or configured to determine that the first gaming device is moved from the first location and in response to the determination that the first gaming device is moved, to determine whether to terminate access to the second poker game from the mobile gaming device.

In other embodiments, the first gaming device may be a mobile device granted access by the at least one server to provide play of a second poker game while the first gaming device is proximate to a first location where the processor may be designed or configured to temporarily suspend access to provide play of the second poker game from the first gaming device while the first gaming device is moved from the first location to a second location where access to play the second poker game is restored at the second location. Also, the first gaming device may be a mobile device granted access by the at least one server to provide play of a second poker game while the first gaming device is proximate to a first location where the processor may be designed or configured to receive a request to temporarily suspend access to provide play of the second poker game from the first gaming device while the first gaming device is moved from the first location and to restore access to play the second poker game when the first gaming device is returned to the first location.

In further embodiments, one or more of the plurality of gaming devices may comprise a receptor for attaching an endpoint of a tether, said tether secured at a first location, and a sensor for determining whether the endpoint of the tether is attached to the receptor. The tether may be configured to provide power or communications to the one or more of the plurality of gaming devices. Further, the processor may be designed or configured to determine the one or more plurality of poker games available for play at the first gaming device based upon the first location of the tether. In addition, after granting access to a second poker game from the first gaming device, the processor may be further designed or configured to, in response to receiving information that the tether is detached from the first gaming device, to determine whether to terminate access to the second poker game from the first gaming device.

Another aspect of the invention pertains to computer program products including a machine-readable medium on which are stored program instructions for implementing any of the methods described above. Any of the methods of this invention may be represented as program instructions and/or data structures, databases, etc. that can be provided on such computer readable media.

In certain embodiments the devices and methods described herein include, but are not limited to any combination of two or more, three or more, or four or more, of the elements or features described above and/or any combination of two or more, or three or more, or four or more of the elements or features described herein.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for enabling secure transactions on a gaming machine. These drawings in no way limit any changes in form and detail that may be made to the invention by one skilled in the art without departing from the spirit and scope of the present invention.

DETAILED DESCRIPTION

Figure 1:
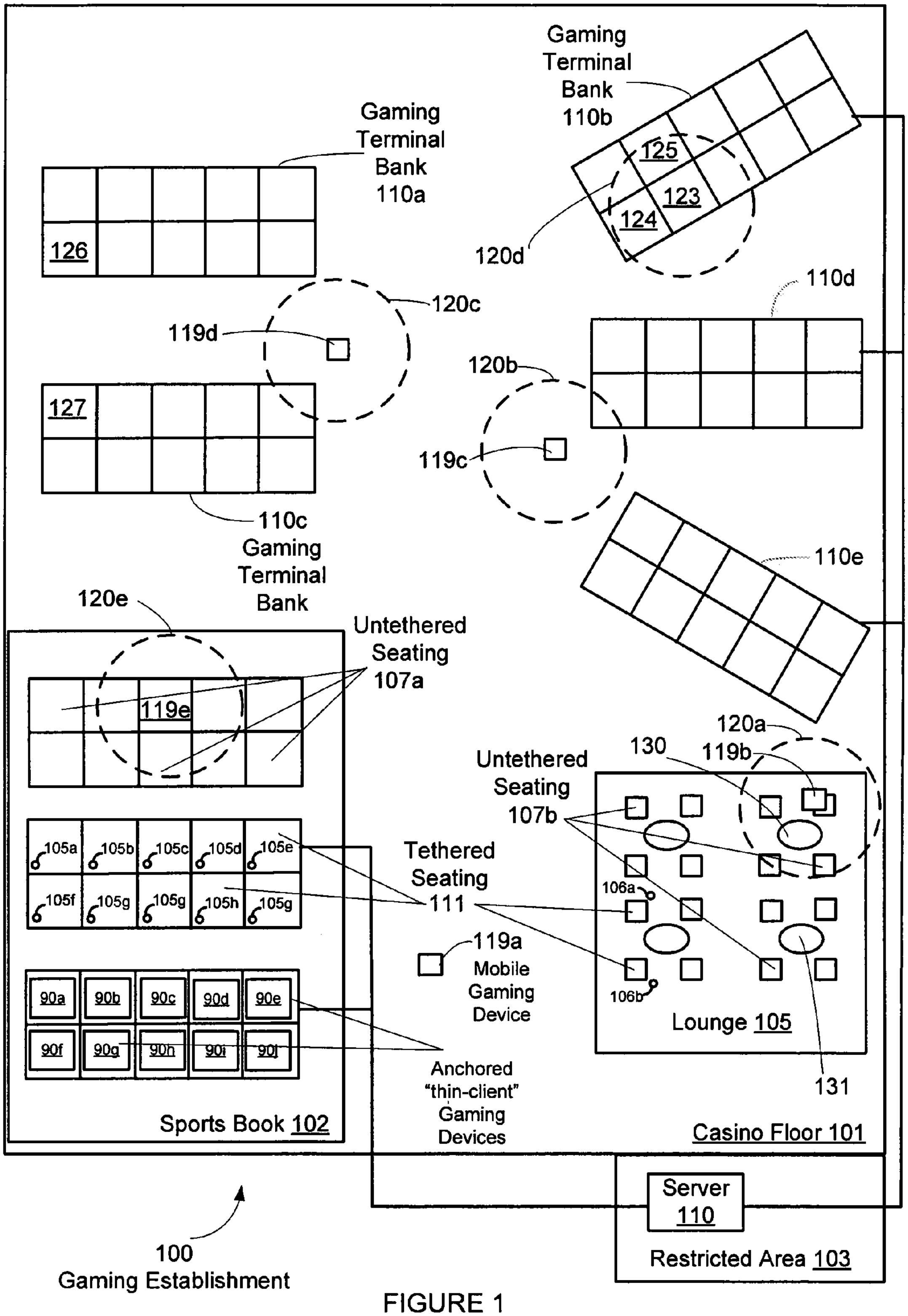
FIG. 1 is a block diagram representing a casino floor for one embodiment of the present invention.

Exemplary applications of systems and methods according to the present invention are described in this section. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

In the following figures, method and apparatus applicable to various gaming system configurations and their associated components are described. The gaming systems may comprise a network infrastructure for enabling one or more hosts to communicate with gaming devices. The gaming devices may be mobile devices that are designed to allow an operator of the mobile device to determine a location at which the mobile device may be used or fixed location devices configured for operational deployment at a particular location, such as within a bank of gaming machines. The gaming devices may be operable to provide play of poker games against other "live" players and may also be operable to provide wagering on a game of chance, such as a slot game, where only a single player is participating.

A plurality of peripheral gaming devices, such as bill/ticket validators, printers, mechanical displays, video displays, coin hoppers, light panels, input buttons, touch screens, key pads, card readers, audio output devices, etc., may be coupled to the gaming devices. The types and numbers of peripheral gaming devices that are coupled to the gaming devices may vary from gaming device to gaming device. For instance, a casino-style slot machine may include bill/ticket validators capable of storing a significant amount of cash and multiple video displays while a mobile gaming device may include a single display and may not include such heavy components, such as bill validator and associated storage for accepted bills.

As previously mentioned, players participating in an on-line poker game against other player desire to know that they are actually playing against other live players and not against a program, such as a poker bot. Towards this end, secure transaction terminals may be provided for game play. The secure transaction terminals may be gaming devices configured with input mechanisms, such as input buttons, that require human actuation to make game play decisions. These terminals may be controlled by a master gaming controller that executes authenticated software to processes inputs received from the input mechanisms and provide a play of a game, such as a poker game.

The terminals may be designed to prevent unauthorized software from being used, such as software that would allow a poker-bot to participate in a poker game via installation on one of the gaming device. For instance, the access to ports that allow software on the gaming device to be modified may be secured within one or more locked cabinets. Further, the master gaming controller used on the terminal may be designed to perform various checks to determine that software residing on the terminal is authorized. Further, the gaming devices may include various sensors to detect tampering, such as an unauthorized access to the master gaming controller. In addition, the gaming devices may be configured so that they can be monitored and tracked in areas providing camera surveillance and may include measures to ensure the gaming devices are only used in such areas.

Figure 2:
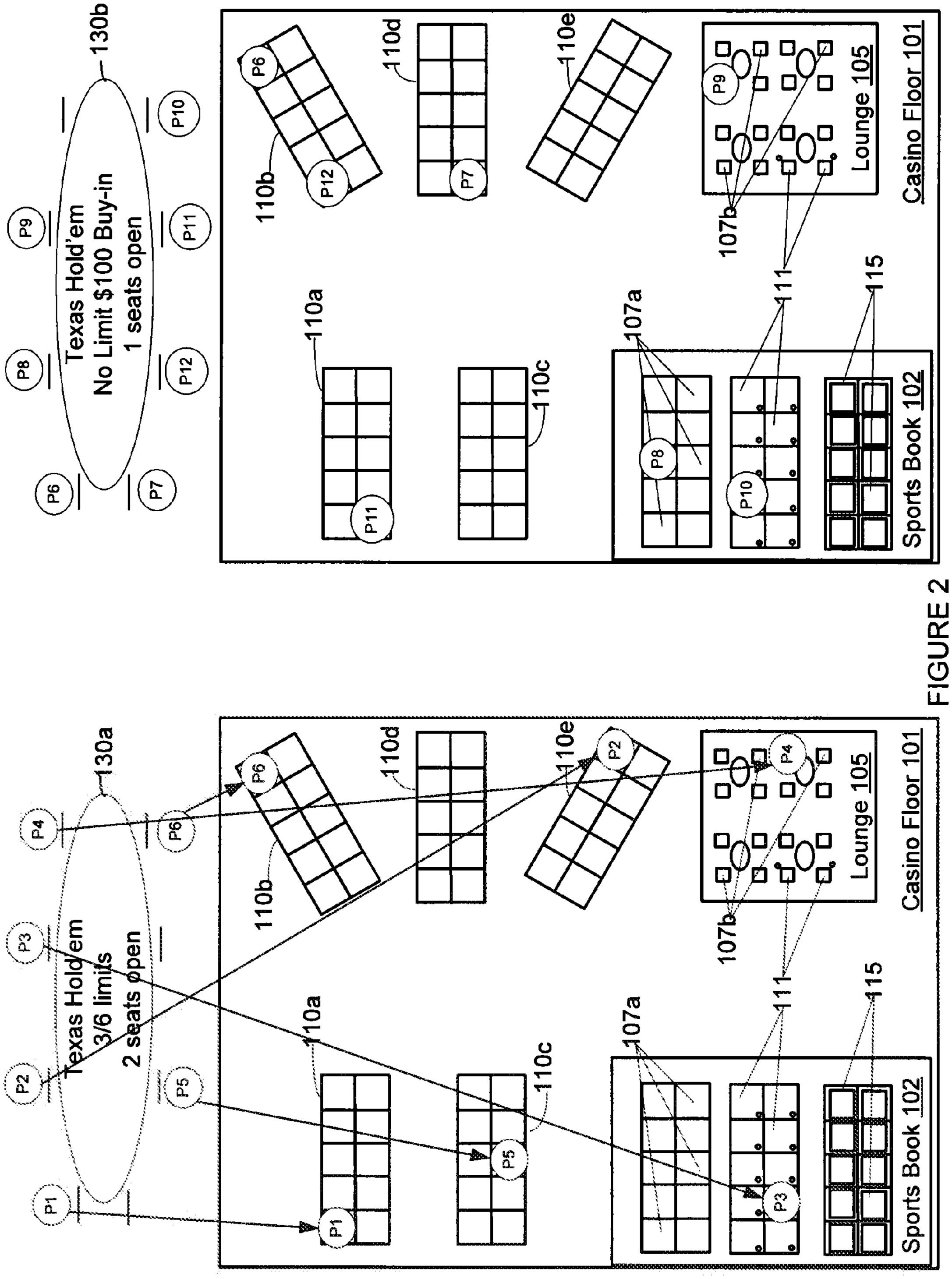
FIG. 2 is a block diagram showing participation in two on-line poker games mapped to a casino floor for one embodiment of the present invention.
Figure 3:
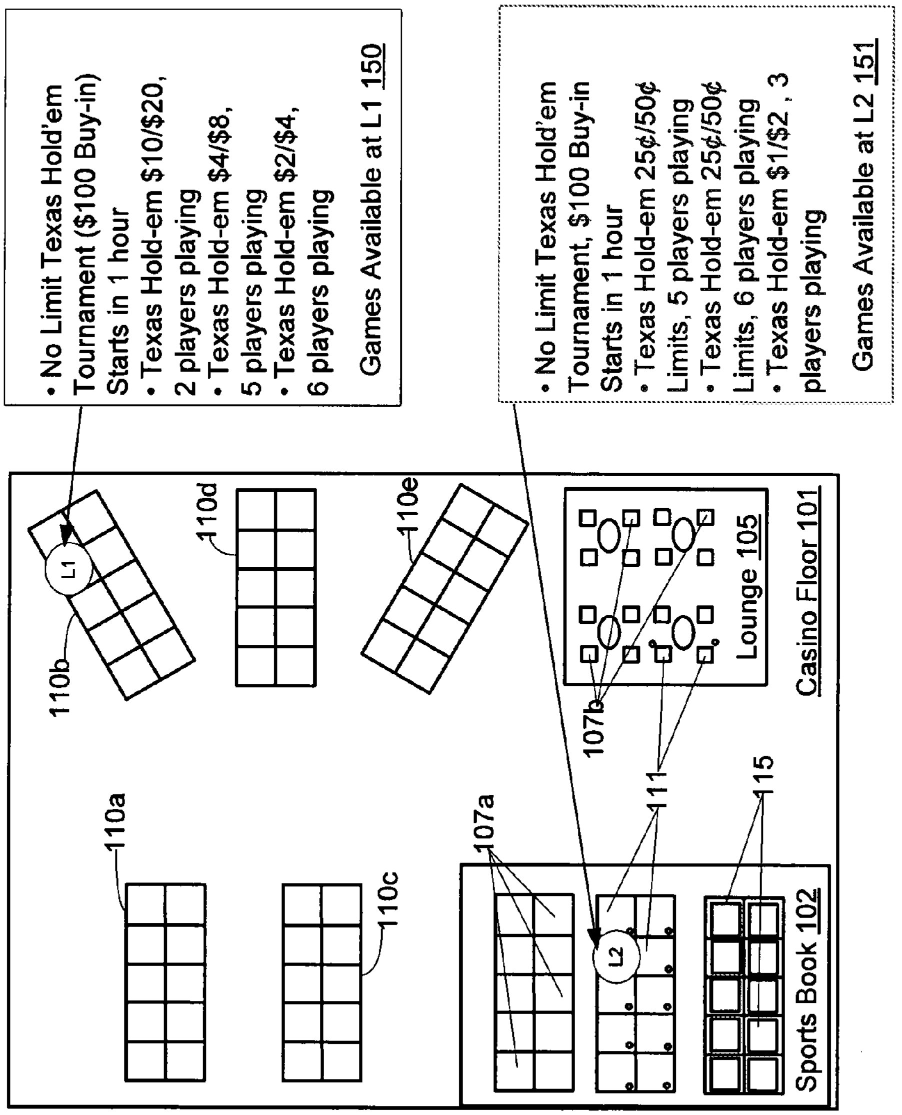
FIG. 3 is a block diagram illustrating location dependent on-line poker game availability for one embodiment of the present invention.

Details of the present invention will be illustrated in the following figures. In FIG. 1 a block diagram representing a casino floor and other areas associated with a gaming establishment are described. In particular, methods and apparatus for allowing participation in on-line poker games providing competition between players and preventing collusion is described. In FIG. 2 a block diagram showing participation in two on-line poker games as a function of location in a gaming establishment are described. In FIG. 3 a block diagram illustrating location dependent on-line poker game availability is described. In particular, factors that are used to determine which games are available at a particular location are further discussed. With respect to FIG. 4, an on-line poker interface screen that may be presented during play is described for illustrative purposes. In FIG. 5 an interaction diagram of a gaming device and a host server providing on-line poker games is described.

Figure 6:
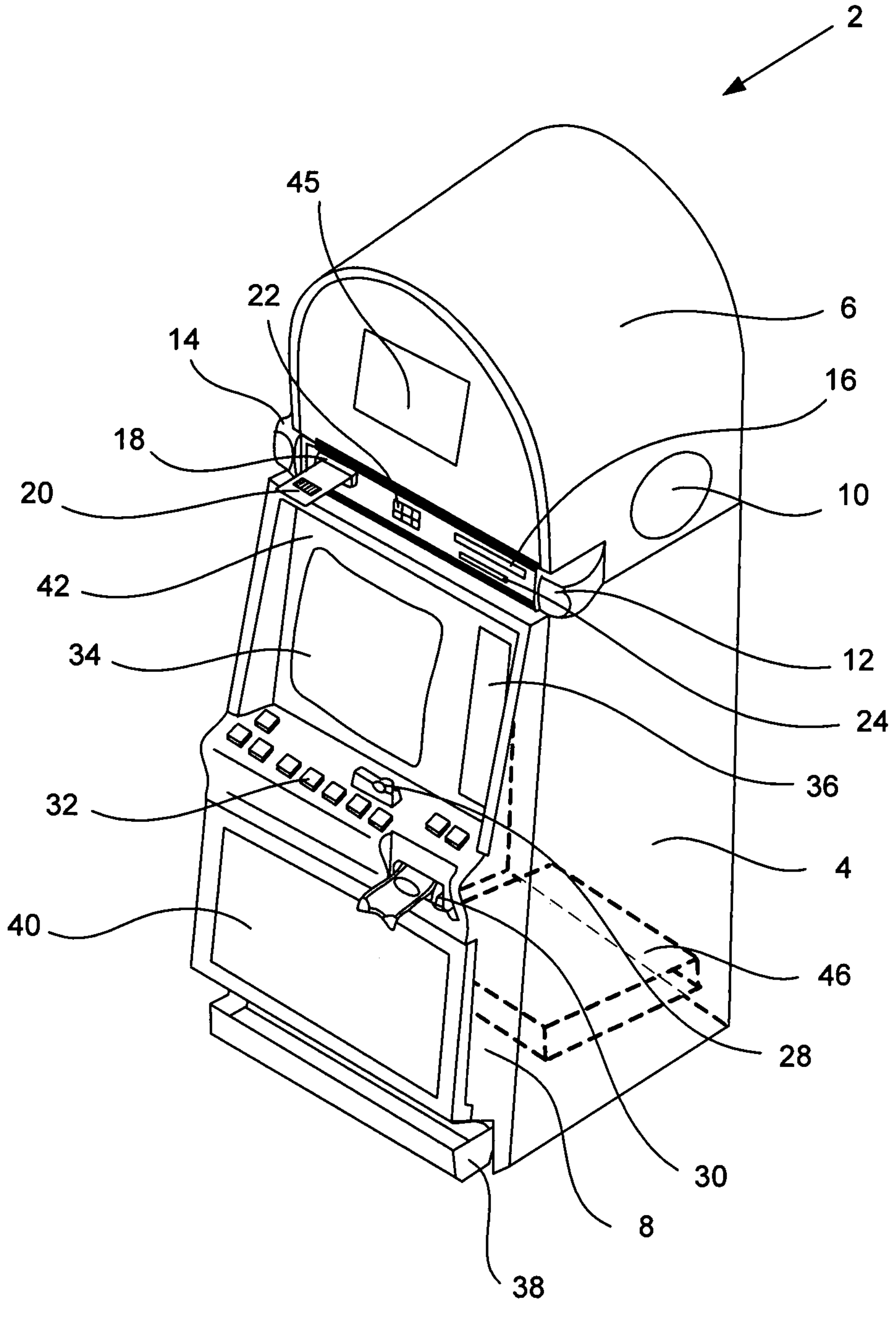
FIG. 6 illustrates a gaming machine.
Figure 7:
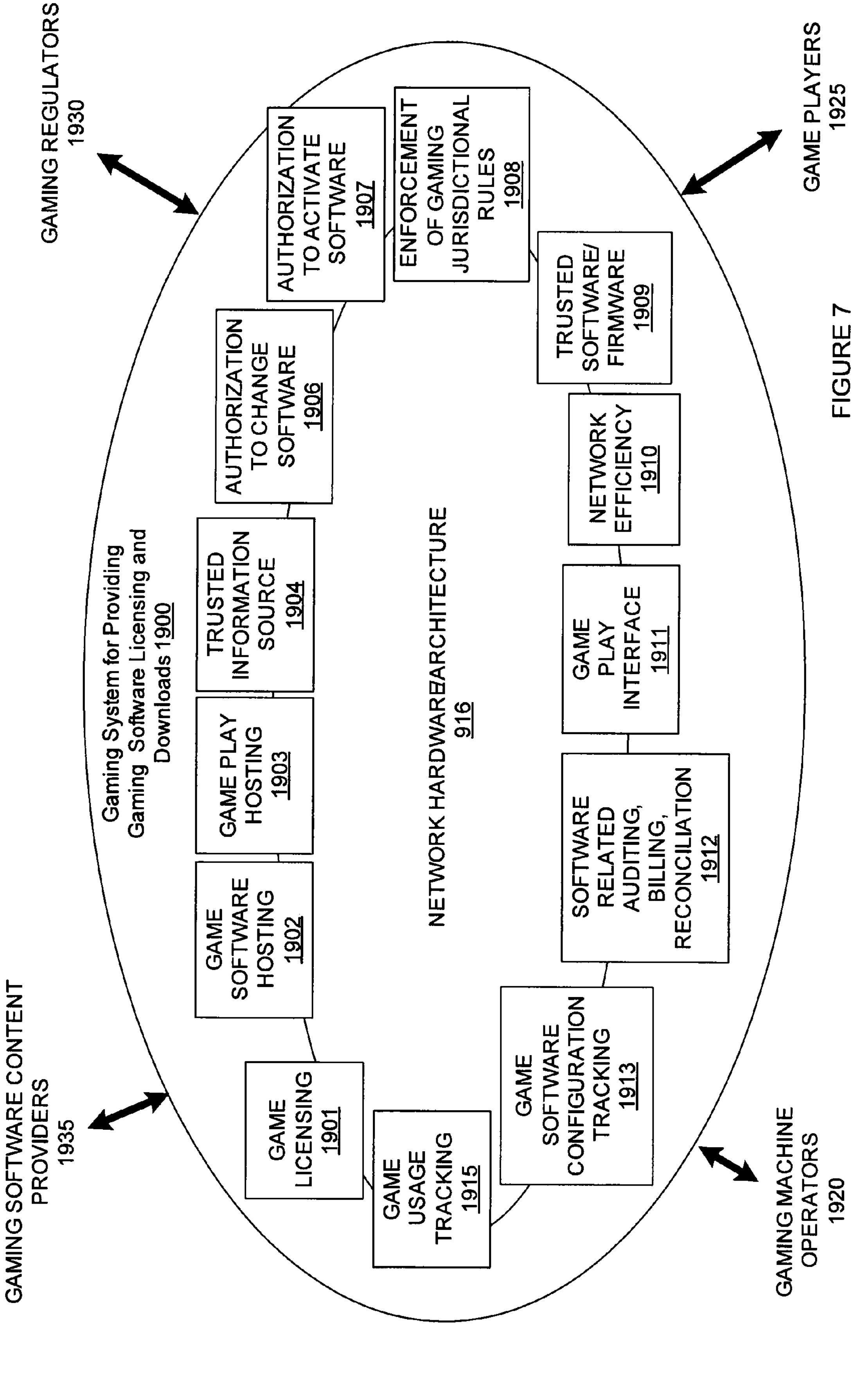
FIG. 7 illustrates a gaming system and associated components.

In FIG. 6 a gaming machine that is designed to be deployed to a fixed location during operation is described. In FIG. 7 a gaming system and associated components that may be utilized with embodiments of the present invention are described. With respect to FIG. 8 components of a server that may be utilized herein are described. Finally, in FIG. 9 a gaming system including a cashless server is described.

Gaming Environment

In FIG. 1 a block diagram representing a casino floor and other areas associated with a gaming establishment 100 are described. The gaming establishment 100 comprises 3 areas, a casino floor 101, a sports book 102 and a lounge 105. These areas within a gaming establishment are described for illustrated purposes only and gaming establishments with or without these areas are possible. Within the gaming establishment 100, poker games involving play against other players including poker tournaments may be provided at various gaming devices.

The gaming devices utilized herein may be of different types. For instance, the gaming devices may be slot-style gaming machines designed for deployment at a fixed locations. These gaming machines may include money-handling capabilities, such as secure storage of large amounts of cash, award-generation capabilities, such as determining awards that are potentially worth millions of dollars. For the purpose of illustration, slot-style gaming machines are shown as being arranged in banks of 10 such gaming machines for illustrative purposes only. Banks 110*a*, 110*b*, 110*c*, 110*d* and 110*e* are shown arranged on a casino floor 101. Gaming machines in the banks may be connected to a server, such as server 110 located in restricted area 103, via various combinations of wired and/or wireless network topologies. Details of slot style gaming machines, connection topologies and devices that may be connected to them, servers and cashless systems are described with respect to FIGS. 6-9.

Mobile gaming devices may also be utilized in embodiments of the gaming systems described herein. Mobile gaming devices, 119*a*, 119*b*, 119*c*, 119*d* and 119*e* are shown at various locations in FIG. 1. For instance, mobile gaming devices, 119*a*, 119*c* and 119*d*, are shown located on the casino floor 101, mobile gaming device 119*b* is shown located in lounge 105 and mobile gaming device 119*e* is shown located in sports book 102. The mobile gaming devices may comprise a video display screen for displaying at least a poker game and various input mechanisms needed to make game playing decisions and establish a game playing session. The mobile gaming devices may be designed such that a player may be able to carry the device to a particular location, such as a location on casino floor 101, the sports book 102, the lounge 105 or another area in the gaming establishment, such as a pool area or a hotel room (each not shown). Details of mobile gaming devices, servers and associated network topologies that may be used herein are described with respect to U.S. patent application Ser. No. 11/367,497, GAME REMOVAL WITH GAME HISTORY, filed, Mar. 3, 2006, U.S. patent application Ser. No. 11/155,702, titled VIRTUAL LEASH FOR PERSONAL GAMING DEVICE, filed Jun. 16, 2005, U.S. patent application Ser. No. 10/871,876, titled, PERSONAL GAMING DEVICE AND METHOD OF PRESENTING A GAME, filed Jun. 17, 2004 and U.S. Pat. No. 6,846,238, entitled, WIRELESS GAME PLAYER, filed, Sep. 28, 2001, each of which is incorporated in its entirety and for all purposes.

Another type of gaming device may be a "thin-client" type gaming device deployed at a fixed location, such as 90*a*-90*j*. These gaming devices may not have all of the capabilities of a casino-style slot machine. In one embodiment, these devices could be a mobile gaming device, anchored or integrated into a fixed location, such as the sports book, 102. In another embodiment, these devices may be "bar-top" type devices. Anchored thin-client gaming devices 115, are shown at locations 90*a*-90*i* in a bank in the sports book 102. The anchored "thin-client" gaming devices may also be connected to server 110.

In playing poker against other players, one player can be placed at a disadvantage if two other players participating in the same game work together or collude. For instance, two players may share information about their cards such that one of the two players always agrees to drop out if the other player has a better hand. At a table game where the players are playing all together, it may be possible for the third player to determine the other two players are working together because the third player may observe the other two players are communicating in some manner. However, in an on-line game, if two players were sitting near each other and could communicate, other players would be unlikely to be seated nearby and would not be able to determine any collusion was occurring.

To prevent collusion in the head-to-head poker games described herein, a server, such as 110, providing the head-to-head poker games may grant access to each of the poker games from a particular gaming device based upon its location relative to other gaming devices. The determination of whether access is to be granted to a particular poker game from a particular gaming device may depend upon whether access is currently granted to the particular poker game from any gaming devices near the particular gaming device. For instance, if access to a particular poker game was granted from gaming machine 123, the server 110 may be configured to not allow access to play the particular poker game from gaming machines on either side of gaming machine 123, such as gaming machine 124. Thus, two players may be prevented from sitting next to each other, such as at two adjacent gaming machine in a bank of gaming machines and participating in the same poker game.

The circles 120*a*, 120*b*, 120*c*, 120*d* and 120*e* around respective gaming devices 119*b*, 119*c*, 119*d*, 123 and 119*e* are used to illustrate that access a poker game has been granted from these devices and that in some area around these devices other gaming devices may be prevent from accessing the poker game. For instance, if gaming device 123 was granted access to a first poker game, then while the first poker game is being played from gaming device 123, the server 110 may not allow gaming device 124 to be used to provide access to the first poker game. As another example, if access was granted to a second poker game at anchored thin-client gaming device 90*h*, then the server 110 may be configured to not grant access to this game from gaming devices 90*f*, 90*g*, 90*i* and 90*j* on either side of 90*h*.

In another example, access to a third poker game may be granted from gaming device 119*b*. As previously described, gaming device 119*b* could be a mobile gaming device. In this example, a player may have carried the mobile gaming device to a seat in the lounge area, sat down and initiated game play of the third poker game. While the gaming device 119*b* was being used to play the third poker game, the server 110 may prevent access to the third poker game from a mobile device near any of the three adjacent seats around table 131. Thus, if a person carrying a mobile gaming device sat in one of the adjacent seats around table 131, the server 110 may be configured to not allow access to the third poker game in this area. Nevertheless, if the person carrying the mobile gaming device moved to another seat, such as around table 132, such that the seat met a separation criteria, e.g., a distance between the mobile gaming devices was greater than some distance, then the server 110 may be configured to grant access to the third poker game from the mobile gaming device at the seat around table 132.

The separation criteria used by the server 110 to determine whether to grant access to a poker game from a particular device is not necessarily a fixed distance defined by a circle as shown in the figure. Other factors, such as walls, and other objects that may prevent or make communication difficult between two gaming device locations where poker games may be provided may be taken into consideration. For example, tables 131 and 132 may be located in separate rooms and the server 110 may be configured to determine whether a location of a gaming device is one room or another room. Thus, two gaming devices may be located on either side of a wall in different rooms and access to the same poker game may be permitted whereas if the two gaming devices were located in the same room and separated by the same distance access two the same poker game by the devices would not be permitted.

As another example, if access to a first poker game is granted from gaming machine 123, the server 110 may be configured to not allow access to the poker game from gaming device 124 but allow access to the first poker game from gaming machine 125. The server 110 may grant access to the first poker game from gaming machines 123 and 125 because gaming machines 123 and 125 are full sized gaming machines aligned back to back where the height of the gaming machines is such that communication over the top of the gaming machine is difficult. Yet, if the first poker game is instantiated at gaming machine 126, the server 110 may be configured to not allow access to first poker game from gaming machine 127 even though the distance between gaming machines 126 and 127 is greater than the distance between gaming machines 123 and 125 where simultaneous access to the first poker game is allowed on gaming machines 123 and 125.

Thus, in general, when access to a poker game is granted from a first gaming device, the server 110 may apply a separation criterion to determine whether access to the poker game is to be blocked from one or more gaming devices located in area proximate to the first gaming device. The separation criterion that is applied, its associated area and the affected gaming devices may vary from location to location. The determination of when to block access or allow access to the poker game from a second gaming device proximate to the first gaming device may be affected by various factors that could affect communication between a first person at the first gaming device and a second person at the second gaming device, such as objects interposed between the first person and the second person that block visual and/or speech communication.

To apply a separation criterion, the server 110 may be configured to utilize location information, such as the location of a gaming machine on a map or a floor plan of the casino where the location is some representative point on the gaming machine, such as a center of its foot print as translated to map or the floor plan. In other embodiments, the server may be configured to consider more complex geometric information, such as 3-D models of gaming devices, people and other objects placed in a scale version of a 3-D model of the gaming establishment. The server 110 may use the 3-D models to perform more complex calculations, such as whether a line of sight exists between two players placed at two different gaming machines where the position of the players in front of the gaming machines may be varied as part of the calculation or whether any lines of sight exist between one or more locations on a first 3-D model of a gaming machine and one or more locations on a second 3-D model of gaming machine.

A determination of whether a line of sight exists may involve drawing a line between two different locations and determining whether the line is obstructed by any intervening objects. For instance, a line may be drawn between a first location on the surface of a first gaming machine and a second location on a second gaming machine. If it is determined the line passes through an object, such as a wall, then the determination may be that a line of sight does not exist between the two gaming machines. This determination could be repeated for one or more points on the surfaces of the gaming machines.

In one embodiment, the other gaming devices that are affected by an instantiation of a poker game on a first gaming device may be pre-determined. For example, for each gaming device, a list of gaming devices for which access to a poker game is to be blocked when access to the poker game is granted from the device, may be pre-determined. This predetermination may involve the line of sight and distance calculations as described above or other separation criteria, such not allowing the same poker game to be played at any two gaming machines at the same bank at the same time. When the poker game is instantiated on each of these gaming devices for which this determination has been made ahead of time, the server 110 can retrieve from memory which other gaming devices are affected. Thus, for each gaming machine, a list may be maintained of poker games that are currently available on the machine and/or poker games that are blocked on the gaming machine based upon poker gaming activity at adjacent gaming machines.

As described above, the server 110 may access a memory storing predetermined relationship between devices. This list may specify which devices are affected, if a poker is instantiated on a particular device. For instance, if a particular poker game is instantiated on gaming device 123, then the memory may indicate that access to the poker game from gaming machine 124 is to be blocked when access is granted to the particular poker game from gaming machine 123. Also, in some instances, the pre-determined list may be used to only designate devices for which it is difficult to develop an accurate separation criterion. For other devices that fall within a scope of a defined separation criterion, the separation criterion may be applied in real-time.

The pre-determined list may not be inclusive of all affected devices. For example, it may not be possible to determine, a priori, whether any mobile gaming devices are affected since their location can vary. Thus, in operation, when developing a list of devices affected by an instantiation of a poker game on a first device, the server 110 may check if there are any predetermined devices that are affected. Then, the server 110 may attempt to determine whether any additional devices are affected using location information associated with the additional devices.

As noted above, the location information may include 3-D models associated with the objects in the gaming establishment, such as gaming machines, peoples, walls and other objects. In particular, the location information may include information such as but not limited to coordinates of a center of the device on the casino floor or coordinates of a center of position where a player would be located if using the device. The location information may specify various relationships between devices, such as information indicating the devices are in the same bank of gaming machine, in a common room or area of the casino, are located in some pre-defined zone, etc. The relationship information may be used to narrow down to which devices the separation criterion is to be applied, such as all devices in the same bank of gaming machines, all devices in the same zone, all devices in the same casino, etc. The relationship information associated with the location information may overlap. For instance, a device in the same bank of gaming machines with another device may also be in the same zone as the other device as well as the same casino.

The list of pre-determined devices affected by the instantiation of a poker game on various gaming devices may be developed by selecting each device and then applying a separation criterion to the adjacent devices. Typically, this method may be applied to devices with fixed locations and distances relative to one another. For the selected device, it is assumed a poker game has been instantiated on a selected device, and then the separation criterion may be applied to adjacent devices to see which devices are to be prevented from accessing the poker game in this situation. The server may provide an operator with various tools that allow an operator to configure a separation criterion, such as inputting separation distances used in the criterion, tools that allow an operator to account for objects interposed between gaming devices and tools that let an operator manually add or delete gaming devices from a list of affected gaming devices associated with a particular gaming device.

During operation, the server 110, for each poker game instantiated on a first gaming device, may maintain a list of gaming devices from which access to the poker game is to be blocked. Gaming devices may be added or removed from this list over time when new gaming devices are allowed access to the poker game or the poker game is terminated at a particular gaming device. As an example, if a poker game is instantiated at gaming device 124, then gaming devices 123 and 125 may be added to a list of block gaming devices associated with the poker game. When the poker game is terminated at gaming device 124, then gaming devices may be removed from the list of block gaming devices associated with the poker game and it may be possible to play the poker game from gaming devices 123 and 125, again.

Updates to the list of blocked gaming devices for each poker game may be updated in response to various events. For instance, if access to a poker game is terminated from a first device, the server 110 may check to determine whether any devices are to be removed from a listed of blocked devices associated with the poker game from which access is blocked. As another example, if a first mobile gaming device is moved from a first position to a second position, for instance, if mobile gaming device 119*a* is moved from its location shown in FIG. 1 to a location proximate to gaming bank 110*c*, then the change in position of the mobile gaming device 119*a* may result in access to certain poker games unblocked and access to other poker games blocked based upon the access granted to various adjacent devices at the old position as compared to the new position of the mobile device 119*a*.

In another embodiment, the list may also be maintained on a machine basis. Thus, for each machine, a list may be maintained of poker games for which a particular machine is not allowed access. This list may be maintained in conjunction or alternatively from the list associated with each poker game.

The list of blocked device associate with each poker game may include devices where blocks have been placed from two or more different devices. For instance, for gaming bank 110*e*, if access to a first poker game were granted from a first gaming device and a second gaming device in the bank 110*e* where the first gaming device and the second gaming device are situated on opposite ends of the bank, then a number of gaming devices in the middle of the bank may have their access blocked as a result of the access granted to either the first gaming device or the second gaming device. Therefore, if after access granting access to the first gaming device and the second gaming device to the poker game and access is terminated from the second gaming device, then some gaming devices in bank 110*e* may be removed from the blocked list for a particular game as a result of access from the second gaming device being terminated. Nevertheless, some gaming devices may still remain on the list because they still blocked from the first gaming device. In general, the server 110 may be configured to account for situations where access to a gaming device to a particular poker game is blocked as a result access granted to the poker game from two or more different devices simultaneously.

The server 110 may be designed or configured to send information to each of the gaming indicating which poker games are available for play from the gaming device at a particular time. In one embodiment, the server may use the lists described above to update each gaming device with poker games from which their access is not blocked as a result of play from another device. This list of available games may be displayed on each device. In another embodiment, the server 110 may be designed or configured to send to a list to each gaming device a list of poker games where open seats are available. If a player selects a poker game at a particular location from which access is blocked, the server 110 may be designed or configured to indicate to the player that access is blocked from the gaming device they have selected but may be available if they move to a gaming device at another location.

In some embodiments, the server 110 may be configured to give the player information in regards to what location or locations the player could move to obtain access to a particular poker game when their access is blocked from a particular gaming device. For instance, if the player tried to access a poker game with a seat available on a gaming device in bank 110*d* that was blocked because of the chosen gaming device's location, the server 110 may be configured to direct the player to move to one of the other adjacent banks 110*b* or 110*e*.

The server 110 may be configured to send instructions to the gaming device to display a message directing or indicating locations where the selected poker game were available as verbal or textual directions or the server 110 could provide instructions for generating a map indicating areas or particular gaming devices where the selected game could be played and their current location. Using the map, a player trying to access the selected game may move to a gaming device where the selected game is available. In the case of a mobile game, the player may move the mobile gaming device from a first area where the selected game was not available to another location/area indicated on the map where the selected poker game is available.

In one embodiment, when a player is blocked from a poker game with an open seat at a gaming device because of the devices location, the server 110 may be configured to accept a temporary hold of the seat in poker seat. For instance, the gaming device could display message asking whether the player wishes the seat held while the move to another location. If an input signal is received indicating the player wishes to hold the seat, then the server 110 could put a temporary hold on the seat in the poker game, such as for a period of time, such as 5 minutes. During this time period, the server 110 would prevent other players from taking the seat.

In one embodiment, the gaming device could provide a unique identifier for the temporary hold, such as a numbers and/or letters, that allow the reservation to be used from another gaming device where access to the desired poker game is not blocked. This number could be printed on a ticket in a machine readable or non-machine readable format. In the case of the machine readable format, the number could be read from the ticket by the gaming device. Thus, the player could receive the unique identifier for a hold on a seat in a poker game at a first gaming where access was blocked, move to a second gaming device where access was not blocked to the poker game and then enter the unique identifier at the second gaming device. Upon validation of the unique identifier, the server 110 could grant access to the player to the held poker seat from the second gaming device. In another embodiment, the reservation could be associated with a player's player tracking account at the first gaming device and when the player inserts their player tracking card at the second gaming device, the system could recognize the player's hold on the seat and al low the player to participate in the game.

In other embodiments, the server 110 may be configured to send messages to each of the gaming devices where access to poker games are available indicating only the poker games that are currently available on each gaming device. Thus, if access to a poker game were blocked from a particular gaming device, the particular gaming device may not display this poker games on a list of available of poker games. The server 110 may regularly update the gaming devices with a current list of available games as access to various gaming device to the poker games is granted or terminated.

Even if a game a game is listed as available on the gaming device, it still may be possible for the player to select a poker game from a list of available games and still not gain access to the game. For instance, a first poker game could be listed as available on two adjacent gaming devices, such as gaming devices 123 and 124. Neither of the gaming devices may be blocked from access to the poker game because it is being accessed by any gaming devices in their vicinity. Nevertheless, if two players simultaneously tried to gain access to the same poker game with two seats available from adjacent devices 123 and 124, access to the game may be blocked from one of these devices. Thus, in applying a separation criterion, the server 110 may consider the location of gaming devices that have been granted access to a particular poker game as well as gaming devices that have requested access but have been granted access yet.

The process of granting access to each gaming device may take a finite amount of time In one embodiment, to prevent conflicts where two players try to access the same poker game from two devices at about the same where access to one of the devices will be blocked after access is granted on one of the gaming devices, the server 110 may be configured to maintain a list of gaming devices requesting access to particular poker game where access has not yet been granted. When a request is initiated from a first gaming device to access a first poker game, the server 110 may add the first gaming device to the list of gaming device requesting access to the first poker game. If there are any predetermined devices that will be blocked access to the first poker game if access is granted to the first gaming device, this information may also be added to the list.

Next, the server 110 may attempt to determine whether any of the devices requesting access to the first poker game but have not been granted access too close to one another. For instance, a separation criterion may be applied between the various devices requesting access. Also, as described above, a first gaming device may be identified by information indicating devices to be blocked from a second gaming device requesting access to the first poker game. When the server 110 determines two devices requesting access to the same poker game but not yet granted access to the same poker game are too close to one another, the server may be configured to give priority to one device over the other. For instance, the server may give priority to the first device that requested access to the poker game of the two devices that are requesting access to the same poker game and are too close to one another. If the first device is successfully granted access to the first poker game, then the second gaming device is denied access. However, if for some reason the first gaming device is not granted access to the first poker game, then the second gaming device may be granted access to the first poker game.

In the situation above, priority may be given to one request over the other request when two or more devices, such as adjacent devices are attempting to obtain access to an identical poker game. For instance, the first request received may be given priority over a later received request for access to the same game from two or more gaming devices that are within a defined separation of one another, such that granting access to one of the gaming devices results in access to the game from the other gaming devices to be blocked. In another example, priority may be granted to a player based upon a loyalty program status, such as the player is a preferred customer in the loyalty program may be granted to access to a particular poker game at a particular device over another player with a lesser status that made the request first, if the other player has a lower status.

In this example, the determinations on the server 110 of the whether the first gaming and the second gaming device are to be granted access may proceed in parallel. It may be possible that one or the other gaming device's access to the first poker game may be blocked access to the first poker game for some other reason than besides the two gaming devices requesting access being too close to one another. For instance, access to one of the gaming devices may be blocked because it is too close to another gaming device for which access to the first poker game is currently blocked. These determinations may be made while the access requests of the two gaming devices to the first poker game are pending.

In one embodiment, the gaming establishment may include tethered seating 111, such as tethered seating locations 105*a*-105*g* and 106*a* and 106*b*. Tethered seating locations 105*a*-105*g* are located in a sports book 102 while tethered seating locations 106*a* and 106*b* are located in the lounge 105. At the tethered seating locations, a communication connection may be established with a mobile device, such as 119*a*. The communication connection may be based in part on hardware/software associated with the tethered seating location. For instance, the tethered seating location may include a physical connector, such as a physical cable that allows a communication and/or power connection to be established between the tethered seating location and the mobile device. In another example, the tethered seating location may include a wireless interface, such as a line of sight infrared interface, or an antenna type wireless interface with a range that requires the device to be close to the tethered seating location. For instance, the device may have to be within a few feet of some point associated with the tethered seating location.

When a connection is made between the tethered seating location, such as 105*a* and a mobile device, such as 119*a*. The server 110 may be configured to determine from which tethered seating location has been made. The server 110 may also comprise location information for each tethered seating location. The location information may be used to apply a separation criterion as previously described. Thus, if a mobile gaming device is placed at each of the tethered seating locations, 105*a*-105*g*, 106*a* and 106*b* various poker games may be blocked from these locations.

In one embodiment, if the mobile gaming device is moved away from a tethered seating location, then access to a particular poker game from the mobile gaming device may be temporarily suspended or terminated. For instance, after a connection has been made between a tethered seating location and a mobile gaming device and access to a particular poker game has been granted at the mobile gaming device, the server 110 may receive information regarding whether a connection, such a wired or wireless connection, between the mobile gaming device and a tethered seating location has been interrupted. If the connection is interrupted, the server 110 may suspend access to the poker game from the mobile gaming device. If the connection is reestablished within a certain time period, the server 110 may lift the suspension and again allow access to the poker game. If the connection is not reestablished within a certain time period, the server 110 may terminate access to the poker game from the mobile gaming device and reopen a seat in the poker game.

In one embodiment, a gaming device, such as a gaming machine or a mobile gaming device, may be configured to send a request to temporarily suspend access from the gaming device. For instance, a request may be made to suspend access to from the gaming device while the player goes to get a snack or use a restroom. While the player is taking a break, the access is suspended from the device but the player's seat is held in the game. When the player returns, the gaming device may be configured to send a request to lift the suspension and allow the player to resume participating in the poker game from the particular location.

The request for a temporary suspension of access may also be used to allow a player to leave a first gaming device at a first location where access to a particular poker game has been granted and move to a second gaming device at a second location and resume participation in the particular poker game has been granted. For instance, the player may be granted access to a first poker game at gaming machine 123, request a suspension of access to the first poker game. Then, the player may relocate to the thin-client device at 90*f*, request the suspension to be lifted and resume playing at this location. In another example, a suspension may be requested while the player moves a mobile gaming device, such 119*c*, from a first location to a second location.

FIG. 2 is a block diagram showing participation in two on-line poker games, 130*a* and 130*b*, mapped to a casino floor for one embodiment of the present invention. These two games may be provided simultaneously. In one embodiment, this type of interface may be only available to an operator or provide of the poker games.

Poker game 130*a* includes a representation of a poker table including seating locations and details about the game, such as but not limited to the type of game, "Texas Hold'em," raise limits, "3/6," and a number of seats open, "2." Six players are shown participating in the game at various locations around a table. Arrows are drawn from the table locations to corresponding locations and associated gaming devices on a map or floor plan of the casino floor. Poker game 130*b* includes a representation of a poker table including seating locations and details about the game, such as but not limited to the type of game, "Texas Hold'em," raise limits, "no limit," and a number of seats open, "1". Six players are shown participating in the game at various locations around a table.

From the interface, the physical locations of the players on the casino floor relative to their positions at the virtual gaming table may be determined. In FIG. 2, the players' locations are shown to be well distributed throughout the casino floor 101. This type of interface may be provide a visual check to an operator that the player's participating in a particular game are not seated too close to one another. In one embodiment, a player may participate in multiple poker games from the same gaming device at the same time. In FIG. 2, player 6 (P6), is shown seated at both games 130*a* and 130*b* and player 6 is shown at the same gaming device for each of the games.

Although in FIG. 2, the players are shown located in a single gaming establishment, the present invention is not limited. In particular embodiments, players may be allowed to participate in on-line poker games from gaming devices located within different gaming establishments. For instance, a virtual table for a poker game may comprise players playing from gaming devices located at two or more different gaming establishment, such as casino located in Las Vegas, Nev. and a riverboat casino located in Mississippi. Server 110 or a combination of servers located at the different gaming establishments may be used to host such games.

The interface may display maps or floor plans that indicate the multiple locations, such as a map of the U.S. showing participants at various locations in the U.S. where each location may be selected to learn about details/locations of participants at a particular location. For instance, interface may display a map of the U.S. may show a map of the U.S. that indicates 15 players are participating from Las Vegas and 5 players are participating from Reno. When one of these cities is selected, one or more different gaming establishments in each city with participants may be indicated. Then, a particular gaming establishment may be selected and a map/floor plan indicating locations of players within the gaming establishment may be displayed on the interface.

The present invention is not limited to allowing participation from a gaming establishment. In some embodiments, a player may be allowed to participate from a remote location, such as a computer located in the player's home. In this embodiment, the player may be provided special software that makes using a poker-bot difficult or some other means may be utilized to insure a live player is participating. The locations of such players may also be indicated on the interface shown in FIG. 2. Details of some methods that may be utilized to insure participation of a live player in a home environment are described in U.S. Pat. No. 6,979,264, titled, "METHOD AND SYSTEM FOR VERIFYING ENTITLEMENT TO PLAY A GAME USING A BIOMETRIC IDENTIFIER," by Chatigny, et al., which is incorporated herein by reference for all purposes.

FIG. 3 is a block diagram illustrating location dependent on-line poker game availability for one embodiment of the present invention. This type of interface may be provided to a player via display device at a gaming device, a kiosk or on a portable device, such as a cell phone or mobile gaming device. This type of interface may also be provided to an operator via a device, such as server 110.

In FIG. 3, poker games available at two locations L1 (150) and L2 (151). The locations are shown on a corresponding map of the casino floor 101. The games available at each location are different. As described above, various poker games may be available at different locations depending on whether access to a particular poker game is granted at adjacent gaming machines.

Although not shown, the interface may include information about the gaming device at a particular location including whether a mobile gaming device is required. For instance, the interface may display information that at location 150, the gaming machine is a video gaming machine offering one or more different games. Further, the interface may display that location 151 requires a mobile gaming device. In addition, the interface may display other types of information about a particular location, such as whether it is noisy or quiet, whether drink service is provided, what type of seat is available, e.g., a lounge chair or a stool.

A gaming device may be configured to allow a particular location to be selected using an input device associated with the gaming device such as a touch screen. The interface (not shown) may be configured to allow a selection of a particular type of game, such as "3/6" Texas Hold'em or "No Limit" Texas Hold'em and then display one or more locations or areas where the game is available. The interface may allow a selection of multiple search parameters, such as "3/6" Texas Hold'em in the lounge 105 and determine whether there are any locations of where Texas Hold'em may be played in lounge 105.

Figure 4:
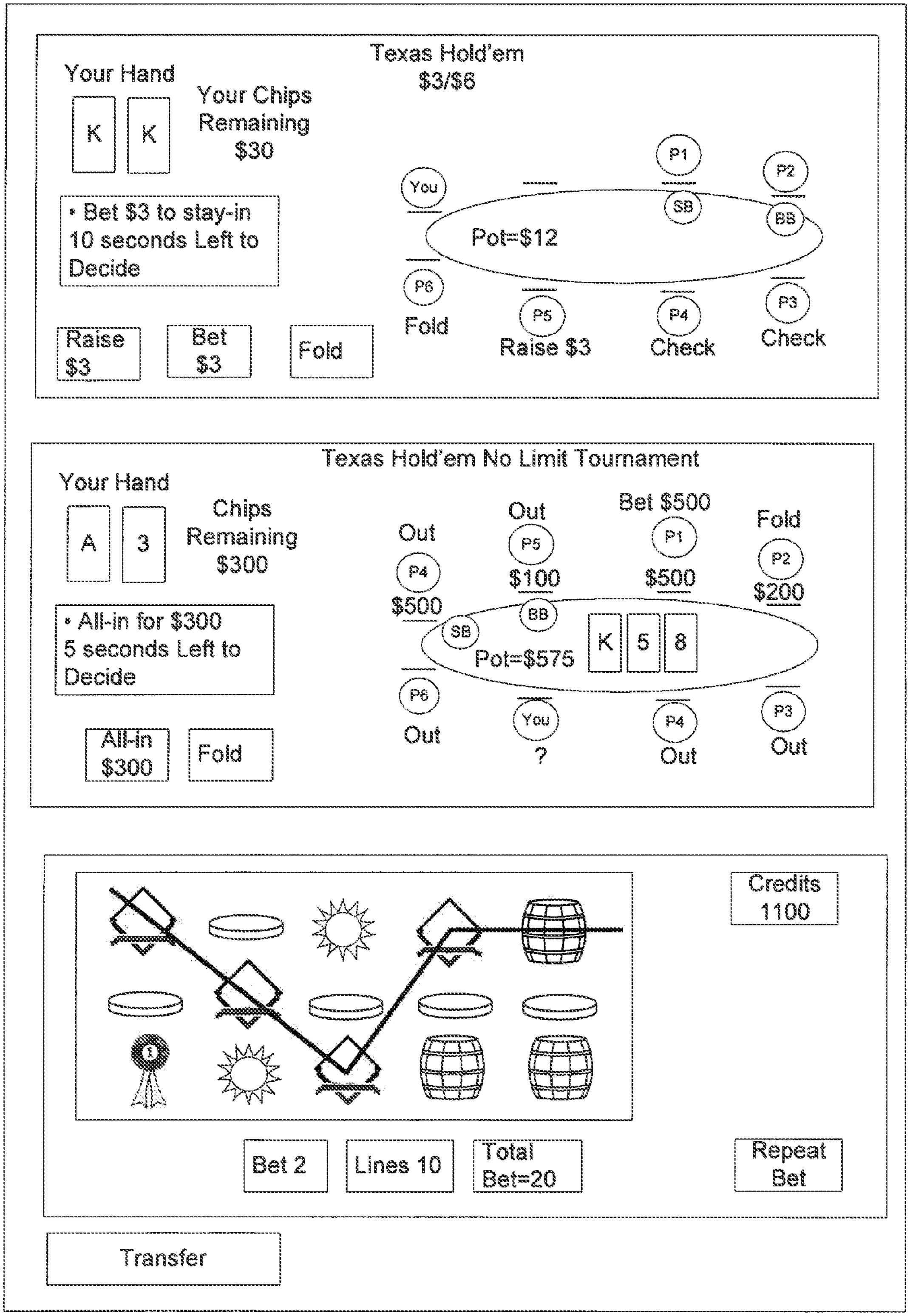
FIG. 4 is a block diagram of a player on-line poker interface screen during play for one embodiment of the present invention.
Figure 5:
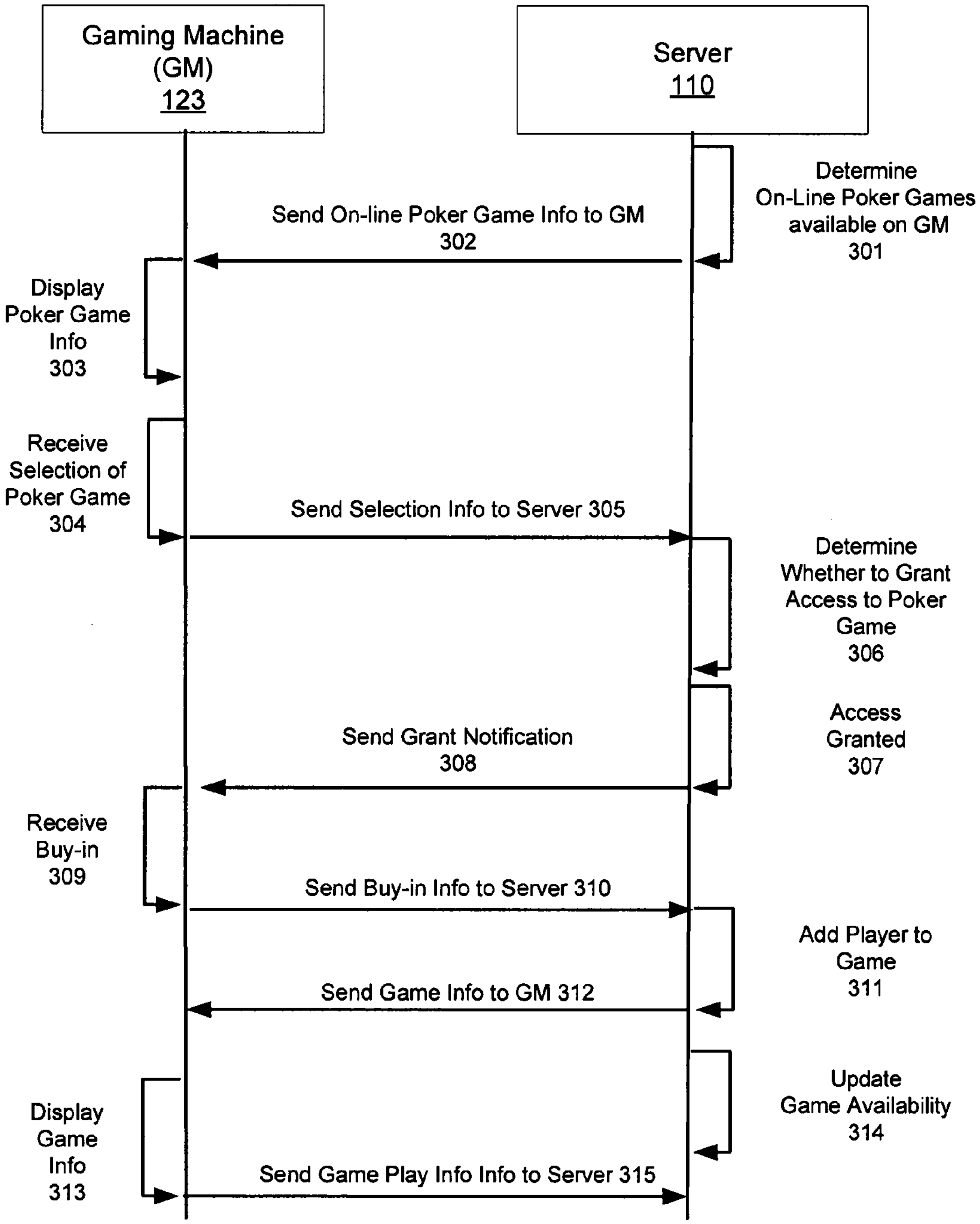
FIG. 5 is an interaction diagram between a gaming device and a host server providing on-line poker, respectively for one embodiment of the present invention

FIG. 4 is a block diagram of a player on-line poker interface screen during play for one embodiment of the present invention. This type of interface may be provided on gaming devices, such as a gaming machine with cash-in/cash-out capabilities, a thin-client device or a mobile gaming device. For illustrative purposes only, an interface configured to allow simultaneous play of two on-line poker games and a slot game are shown. The interface is not limited to this configuration and various combinations of poker games and other types of games are possible.

At the top of the interface, the first poker game is a Texas Hold'em game against 5 other players. The interface displays information about player actions, such as check, fold or raise, chips remaining, a player's hand, community cards, an action, including a time limit, to be made by the player, "Bet $3 to stay-in, 10 seconds to decide," and input indicators, such "Bet $3," for indicating a selection of an action. These input indicators may be selected using an input device, such as a touch screen or other input buttons on an associated gaming device.

In the middle of the interface is a second poker game for a No Limit Texas Hold'em tournament. Like the first poker game, information about the tournament poker game as well as player needed player actions may be displayed in the interface. The player may enter the tournament by paying an entrance fee, which entitles the player to certain amount of chips. At the bottom of the interface is a video slot game that may be played while the on-line poker games are being played.

In some embodiments, depending on the poker game, it may be possible using the transfer button to convert credits to poker chips and vice versa. For instance, the interface may allow a player to convert credits from the video slot game to chips in the Texas Hold'em game or allow the player to convert chips in the Texas Hold'em game to credits used for wagering in the video slot game or another on-line poker game. However, for some games, such as the tournament poker game where there was a buy-in, it may be possible to use credits for a buy-in to the poker tournament but it may not be possible after the buy-in to convert the tournament chips to credits available for the "3/6" Texas Hold'em game of the video slot game.

FIG. 5 is an interaction diagram between a gaming machine 123 and a host server 110 providing on-line poker, respectively for one embodiment of the present invention. In 301, the server may determine one or more on-line poker games that may be potentially access from the gaming machine 123. As described above, this determination may be based upon apply a separation criteria and/or checking one or more lists indicating whether gaming machine 123 is blocked from any games. In 302, the server may send on-line poker game information to the gaming machine 302. In 303, the gaming machine may display the on-line poker game information received from the server.

In 304, the gaming machine may receive an input indicating a selection of a poker game corresponding to one of the poker games displayed in 303. In 305, the gaming machine may send selection information to the server 305. In 306, the server 110 may determine whether to grant access to the poker game. This determination may include applying a separation criterion and checking for any pending game requests. In 307 and 308, access may be granted to the on-line poker game and notification of the grant as well as initial game information may be sent to the gaming machine.

In 309, the gaming machine 123 may receive a buy-in. The buy-in may be a tournament entry fee or an amount of poker chips. In 310, the buy-in information may be sent to server 310. In 311, the server 110 may add the player to the selected game and provide more game information to the gaming machine in 313. In 313, the gaming machine may provide the on-line poker game hosted on the server 110. In 315, the gaming machine may send game play information such as game choices made in the play of the on-line poker game to the server 110.

Gaming Devices

As illustrated in the example of FIG. 6, machine 2 includes a main cabinet 4, which generally surrounds the machine interior and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, OLED, plasma or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2.

According to a specific embodiment, the devices may be controlled by code executed by a master gaming controller 46 housed inside the main cabinet 4 of the machine 2. The hardware and software associated with the master gaming controller 46 may be distributed throughout the cabinet 4 and is not limited to the specific location illustrated in the FIG. 6. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 6, the gaming machine 2 may include a top box 6, which sits on top of the main cabinet 4. The top box 6 may house a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 9. For example, the top box may include a bonus wheel or a backlit silk screened panel, which may be used to add bonus features to the game being played on the gaming machine or a wireless interface for communication with a patron card. As another example, the top box may include a display for a progressive jackpot offered on the gaming machine. During a game, these devices may be controlled and may be powered, in part, by circuitry (e.g. a master gaming controller) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., balance) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RA1\4 Interface", U.S. Pat. No. 6,863,608, titled "Frame Capture of Actual Game Play," U.S. Pat. No. 7,111,141, titled, "Dynamic NV-RAM," and U.S. Pat. No. 7,384,339, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS or Super-SAS are communication protocols used to transmit information, such as metering information, from a gaming machine to a remote device. Often SAS or Super-SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. In particular embodiments, a JAM (Java Access Module) card in a gaming machine may treat information received from the master gaming controller as not trusted as it may be unaware that the gaming machine includes a trusted memory device. The JAM cards may be used to authenticate the portable card devices described herein. JAM cards and associated methods may be utilized with the portable card devices described herein are described in detail in U.S. patent application Ser. No. 11/967,916, titled, "IMPROVED METHODS AND ARCHITECTURE FOR CASHLESS SYSTEM SECURITY," by Cunningham II, et al, filed Dec. 31, 2007, which is incorporated herein in its entirety and for all purposes.

Trusted memory devices and controlling circuitry are typically designed to not allow modification of the code and data stored in the memory device while the memory device is installed in the gaming machine The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. Pat. No. 7,515,718, entitled "Secured Virtual Network in a Gaming Environment", naming Nguyen et al. as inventors, filed on Mar. 10, 2005, herein incorporated in its entirety and for all purposes. This application also describes authentication and device verification methods that may be applied to the portable card devices described with respect to FIGS. 1-5.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, TGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 6, when a user wishes to play the gaming machine 2, he or she inserts cash through the coin acceptor 28 or bill validator 30. Additionally, the bill validator may accept a printed ticket voucher, which may be accepted by the bill validator 30 as indicia of credit when a cashless ticketing system is used. In addition, the gaming machine may include an interface that allows a patron card or other portable device described with respect to FIG. 18 to communicate with the gaming machine including a transfer of credits between the portable gaming device and the gaming machine.

At the start of the game, the player may enter playing tracking information using the card reader 24, the keypad 22, and the florescent display 16. Further, other game preferences of the player playing the game may be read from a card inserted into the card reader. In one embodiment, the card reader on the gaming machine may be configured to accept the portable card devices described with respect to FIGS. 1-5. Further, the player tracking unit may include a JAM card that allows credits to be transferred to and from the gaming machine and to and from the patron card via the player tracking unit. In particular, the player tracking unit may be operable to communicate with a cashless server.

During the game, the player may view game information using the video display 34. Other game and prize information may also be displayed in the video display screen 45 located in the top box. During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one or more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. When the portable card device includes a display, some indication, such as a text or a symbol may be activated on the display to indicate this information is stored on the card.

Gaming System Components

FIG. 7 shows a block diagram illustrating components of a gaming system 1900 which may be used for implementing various aspects of the present invention. In FIG. 7, the components of a gaming system 1900 for providing game software licensing and software downloads are described functionally. The described functions may be instantiated in hardware, firmware and/or software and executed on a suitable device. These downloads may include downloads of applets for JAM cards or patron cards and software for allowing terminals to interact with JAM cards or patron cards. In the system 1900, there may be many instances of the same function, such as multiple game play interfaces 1911. Nevertheless, in FIG. 7, only one instance of each function is shown. The functions of the components may be combined. For example, a single device may comprise the game play interface 1911 and include trusted memory devices or sources 1909. The described components and their functions may be incorporated various embodiments of the servers and devices described with respect to FIGS. 1-6.

The gaming system 1900 may receive inputs from different groups/entities and output various services and or information to these group s/entities. For example, game players 1925 primarily input cash or indicia of credit into the system, make game selections that trigger software downloads, and receive entertainment in exchange for their inputs. Game software content providers 1935 provide game software for the system and may receive compensation for the content they provide based on licensing agreements with the gaming machine operators. Gaming machine operators select game software for distribution, distribute the game software on the gaming devices in the system 1900, receive revenue for the use of their software and compensate the gaming machine operators. The gaming regulators 1930 may provide rules and regulations that must be applied to the gaming system and may receive reports and other information confirming that rules are being obeyed.

In the following paragraphs, details of each component and some of the interactions between the components are described with respect to FIG. 7. The game software license host 1901 may be a server connected to a number of remote gaming devices that provides licensing services to the remote gaming devices. For example, in other embodiments, the license host 1901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1915 may track the usage of game software on a plurality of devices in communication with the host. The game usage-tracking host 1915 may be in communication with a plurality of game play hosts and gaming machines. From the game play hosts and gaming machines, the game usage tracking host 1915 may receive updates of an amount that each game available for play on the devices has been played and on amount that has been wagered per game. This information may be stored in a database and used for billing according to methods described in a utility based licensing agreement.

The game software host 1902 may provide game software downloads, such as downloads of game software or game firmware, to various devious in the game system 1900. For example, when the software to generate the game is not available on the game play interface 1911, the game software host 1902 may download software to generate a selected game of chance played on the game play interface. Further, the game software host 1902 may download new game content to a plurality of gaming machines via a request from a gaming machine operator.

In one embodiment, the game software host 1902 may also be a game software configuration-tracking host 1913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, “Gaming Terminal Data Repository and Information System,” filed Dec. 21, 2000, which is incorporated herein in its entirety and for all purposes.

A game play host device 1903 may be a host server connected to a plurality of remote clients that generates games of chance that are displayed on a plurality of remote game play interfaces 1911. For example, the game play host device 1903 may be a server that provides central determination for a bingo game play played on a plurality of connected game play interfaces 1911. As another example, the game play host device 1903 may generate games of chance, such as slot games or video card games, for display on a remote client. A game player using the remote client may be able to select from a number of games that are provided on the client by the host device 1903. The game play host device 1903 may receive game software management services, such as receiving downloads of new game software, from the game software host 1902 and may receive game software licensing services, such as the granting or renewing of software licenses for software executed on the device 1903, from the game license host 1901.

In particular embodiments, the game play interfaces or other gaming devices in the gaming system 1900 may be portable devices, such as electronic tokens, cell phones, smart cards, tablet PC’s and PDA’s. The portable devices may support wireless communications and thus, may be referred to as wireless mobile devices. The network hardware architecture 1916 may be enabled to support communications between wireless mobile devices and other gaming devices in gaming system. In one embodiment, the wireless mobile devices may be used to play games of chance.

The gaming system 1900 may use a number of trusted information sources, such as the HSM previously described. Trusted information sources 1904 may be devices, such as servers, that provide information used to authenticate/activate other pieces of information. CRC values used to authenticate software, license tokens used to allow the use of software or product activation codes used to activate to software are examples of trusted information that might be provided from a trusted information source 1904. Trusted information sources may be a memory device, such as an EPROM, that includes trusted information used to authenticate other information. For example, a game play interface 1911 may store a private encryption key in a trusted memory device that is used in a private key-public key encryption scheme to authenticate information from another gaming device.

When a trusted information source 1904 is in communication with a remote device via a network, the remote device will employ a verification scheme to verify the identity of the trusted information source. For example, the trusted information source and the remote device may exchange information using public and private encryption keys to verify each other’s identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1900 of the present invention may include devices 1906 that provide authorization to download software from a first device to a second device and devices 1907 that provide activation codes or information that allow downloaded software to be activated. The devices, 1906 and 1907, may be remote servers and may also be trusted information sources. One example of a method of providing product activation codes that may be used with the present invention is describes in previously incorporated U.S. Pat. No. 6,264,561.

A device 1906 that monitors a plurality of gaming devices to determine adherence of the devices to gaming jurisdictional rules 1908 may be included in the system 1900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 1916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 1910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and gams licensing related auditing, billing and reconciliation reports to server 1912. For example, a software licensing billing server may generate a bill for a gaming device operator based upon a usage of games over a time period on the gaming devices owned by the operator. In another example, a software auditing server may provide reports on game software downloads to various gaming devices in the gaming system 1900 and current configurations of the game software on these gaming devices.

At particular time intervals, the software auditing server 1912 may also request software configurations from a number of gaming devices in the gaming system. The server may then reconcile the software configuration on each gaming device. In one embodiment, the software auditing server 1912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 7. Many of the interactions are coupled. For example, methods used for game licensing may affect methods used for game downloading and vice versa. For the purposes of explanation, details of a few possible interactions between the components of the system 1900 relating to software licensing and software downloads have been described. The descriptions are selected to illustrate particular interactions in the game system 1900. These descriptions are provided for the purposes of explanation only and are not intended to limit the scope of the present invention.

Figure 8:
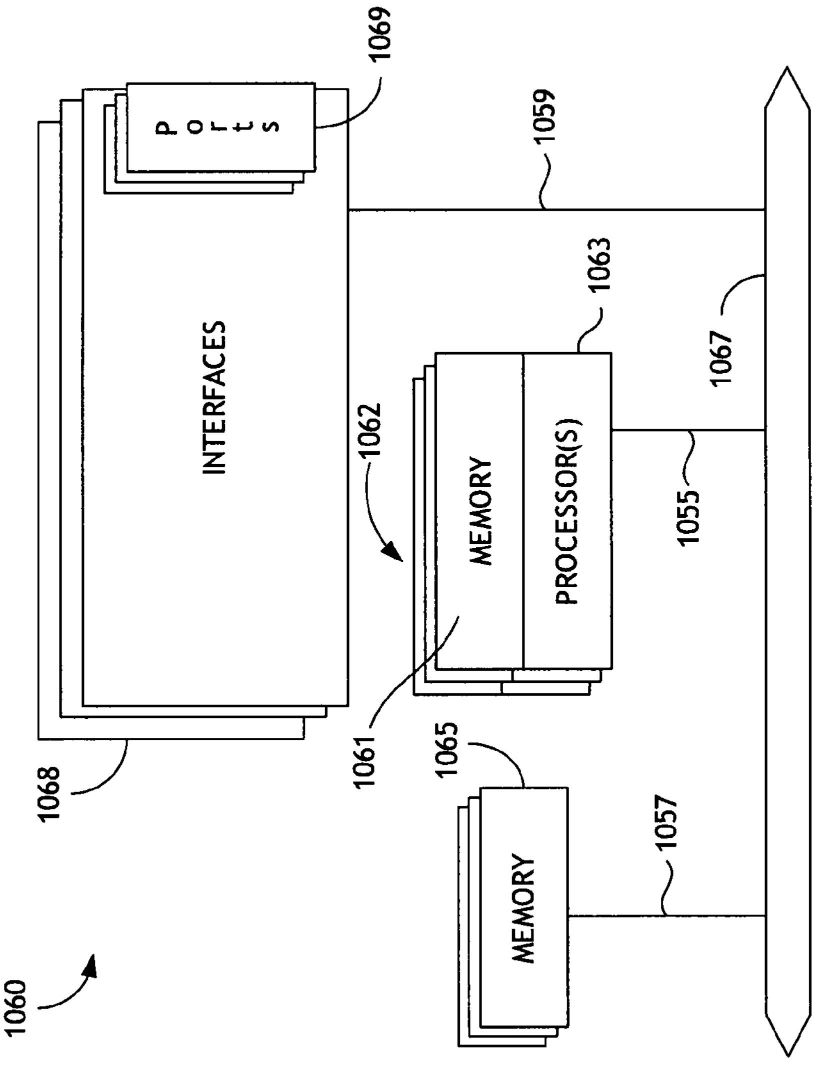
FIG. 8 illustrates components of a server.

FIG. 8 illustrates an example of a network device that may be configured for implementing some methods of the present invention, such as methods associated with pushing messages to a portable card device. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, AS1 interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 8) or switch fabric based (such as a cross-bar).

Figure 9:
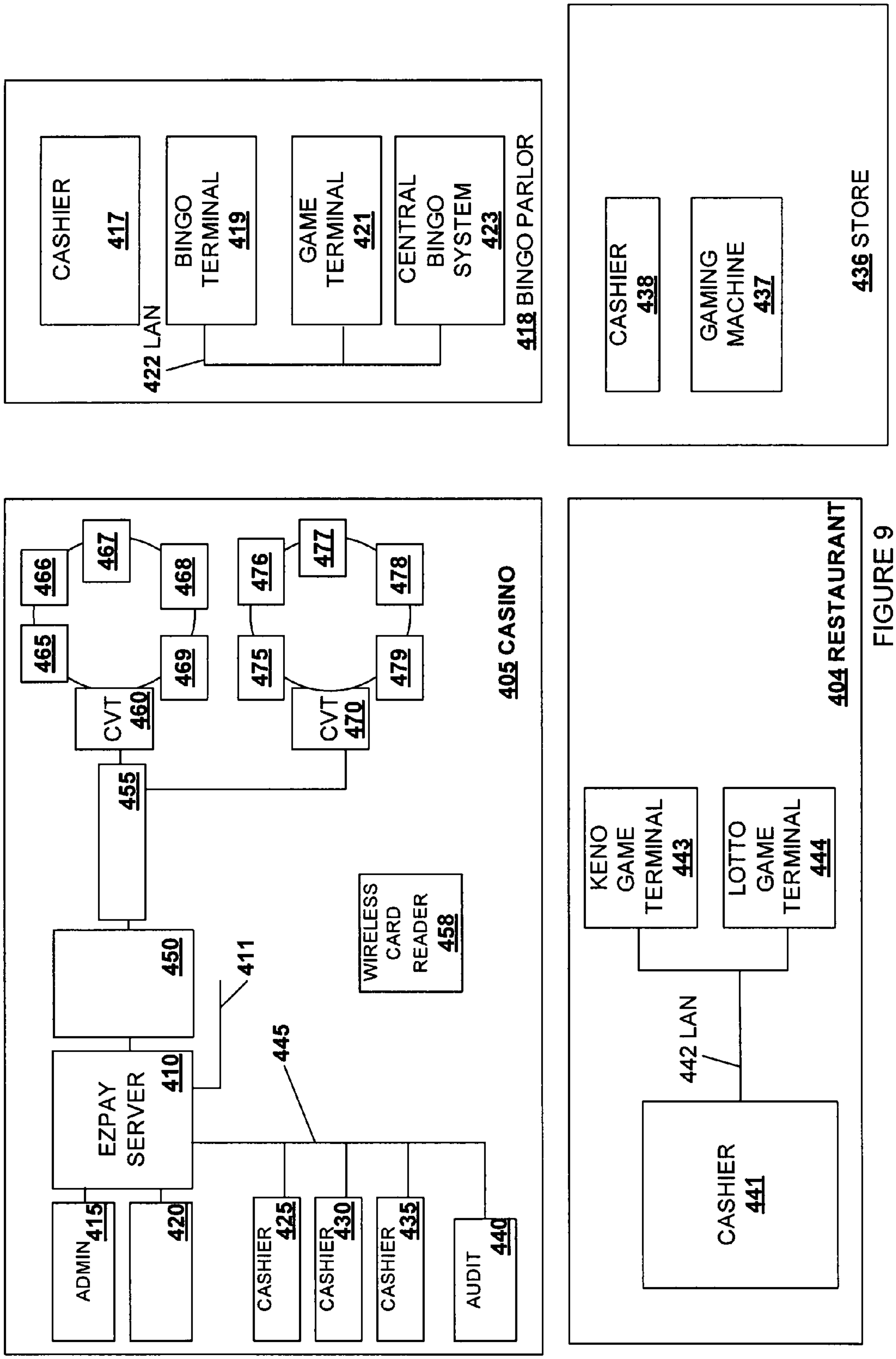
FIG. 9 illustrates gaming system including a cashless server.

FIG. 9 is a block diagram containing a plurality of gaming venues including a casino 405, a restaurant 404, a bingo parlor 418 and a store 436 where a portable card device may be utilized for one embodiment of the present invention. In one embodiment, the portable card device may be used with a cashless system such as an EZ pay TM ticket voucher system. A cashless system is the hardware components and software components needed to generate and validate cashless instruments. In FIG. 9, one embodiment of the components of a cashless system that may be used with a portable card device is shown within the casino 405. Further details are described with respect to U.S. Pat. No. 6,852,031, by Rowe, and titled, "EZ Pay™ smart card and ticket system," which is incorporated herein by reference in its entirety and for all purposes. In this patent, examples of applications that may be incorporated as programming for a logic device of the portable card devices as described herein are also discussed.

Components of a cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ Pay™ ticket voucher system. Typically, a cashless system is installed at each property utilizing cashless instruments. To allow multi-site validations of cashless instruments, the cashless systems at each property may be linked to a cashless instrument transaction clearinghouse.

Returning to FIG. 9, a first group of gaming machines, 465, 466, 467, 468, and 469 is shown connected to a first clerk validation terminal (CVT) 460 and a second group of gaming machines, 475, 476, 477, 478 and 479 is shown connected to a second CVT 470. All of the gaming machines print ticket vouchers which may be exchanged for cash or accepted as credit of indicia in other gaming machine located within the property 405. In this example, the ticket voucher serves as a cashless instrument. In addition, the gaming machines may contain smart card readers for reading voucher information stored on smart cards. As described above, vouchers stored on the smart card may be used for game play on the gaming machines.

The CVTs, 460 and 470, store cashless instrument transaction information corresponding to the outstanding cashless instrument, including ticket vouchers, smart cards and debit cards, that are waiting for redemption. In addition, cashless instrument transaction information may be stored in a cashless server including the EZ pay server 410. The cashless instrument transaction information may be used when the vouchers are validated and cashed out or redeemed in some manner. The CVTs 460 and 470 may store the information for the ticket vouchers printed by the gaming machines connected to the CVT. In addition, the CVTs 460 and 470 may store the information for vouchers stored on a smart card that were generated on each gaming machine. For example, CVT 460 stores voucher information for vouchers issued by gaming machines 465, 466, 467, 468, and 469. In addition, the CVTs may store security information, as described above for the smart cards. The security information may be used to validate a digital signature generated by the smart card or to cancel a card.

In this embodiment, when a player wishes to cash out a voucher, the player may redeem vouchers issued from a particular gaming machine at the CVT associated with the gaming machine or any other CVT which is part of the cashless system associated with the CVT. For example, since CVT 460 and CVT 470 are connected as part of a single cashless system to the EZ pay server 410, a player may redeem vouchers or utilize vouchers at the gaming machines, the CVT's (460 or 470), the cashiers (425, 430, 435, and 440) or the wireless cashiers 458. The CVTs, cashiers, wireless cashiers and gaming machines may be referred to as "cashless validation sites."

To cash out a voucher stored on a portable card device, the portable card device may be utilized with an embodiment of a card acceptor mechanism described with respect to FIG. 2A or 2B, at the cashless validation site and the authenticity of the portable card device may be determined. For an authenticated portable card device storing one or more vouchers, one of the vouchers is validated by comparing information obtained from the voucher with information stored within the CVT. After a ticket voucher has been cashed out, the CVT marks the voucher paid in a database to prevent a voucher with similar information from being cashed multiple times.

In this embodiment using the cashless system, multiple groups of gaming machines connected to CVTs are connected together in a cross validation network 445. The cross validation network is typically comprised of one or more concentrators 455 which accepts inputs from two or more CVTs and enables communications to and from the two or more CVTs using one communication line. The concentrator is connected to a front end controller 450 which may poll the CVTs for voucher information. The front end controller may be connected to a cashless system server 410 which may provide a variety of information services for the cashless system including accounting 420, administration 415, as well as portable card device security.

A single hardware and software platform allowing cashless instruments to be utilized at all of the cashless validation sites (e.g. cashier stations, gaming machines, wireless cashiers and CVTs) within a single property or across multiple properties may be referred to as a "cashless server". Usually, the cashless server is a communication nexus in the cross validation network. For instance, the cashless server 410 may be connected to the cashiers, wireless devices, CVTs, the gaming machines and gaming tables (not shown) via the CVTs. Since the cashless server 410 is connected to the devices utilizing portable card devices, it may be used to implement security features such as clearing the use of a portable card device after it has entered a fail-safe or canceling a portable card device.

The cross validation network allows vouchers issued by any gaming machine connected to the cross validation to be accepted by other gaming machines in the cross validation network 445. Additionally, the cross validation network allows a cashier at a cashier station 425, 430, and 435 to validate any voucher generated from a gaming machine within the cross validation network 445. To cash out a voucher, a player may present a smart card storing one or more vouchers at one of the cashier stations 425, 430, and 435 or to a game service representative carrying a wireless gaming device for validating ticket vouchers. A more complete discussion of the details of the wireless gaming device 458, including hardware and utilization, are described in U.S. patent application Ser. No. 09/544,844 entitled a WIRELESS GAME ENVIRONMENT filed Apr. 7, 2000 by Rowe, now U.S. Pat. No. 6,682,421, which is incorporated herein by reference in its entirety and for all purposes. Information obtained from the voucher may be used to validate the voucher by comparing information on the ticket with information stored on one of the CVTs connected to the cross validation network or with information stored in the cashless server 410.

As vouchers stored on smart cards are validated, this information may be sent to audit services computer 440 providing audit services, the accounting computer 420 providing accounting services or the administration computer 415 providing administration services. In another embodiment, all of these services may be provided by the cashless server including the cashless server 410. Examples of auditing services, which may be provided by cashless system software residing on the auditing computer 440 include 1) session reconciliation reports, 2) soft count reports, 3) soft count verification reports, 4) soft count exception reports, 5) machine voucher status reports and 5) security access report. Examples of accounting services, which may be provided by cashless system software residing on the accounting computer 420 include 1) voucher issuance reports, 2) voucher liability reports, expired voucher reports, 3) expired voucher paid reports and 4) voucher redemption reports. Examples of administration services, which may be provided by cashless system software residing on the administration computer 415 include 1) manual voucher receipt, 2) manual voucher report, 3) voucher validation report, 4) interim validation report, 5) validation window closer report, 6) voided voucher receipt and 7) voided voucher report.

A portable card device used at the casino 405 may also be used at other venues. For instance, after storing one or more cashless vouchers on a portable card device, a player may take the smart card to the bingo parlor 418. At the bingo parlor 418, a player may utilize the smart card at the bingo terminal 419 and game terminal 421 which may be connected to a LAN 422 to a central gaming system 423. At the cashier 417, electronic bingo cards may be downloaded to the smart card from the central electronic bingo system 423 and issued to the player. The player then may insert the smart card into the stationary player such as the bingo terminal 419, handheld player, or other applicable game play devices and may load the bingo cards from the smart card for use in a bingo game. As the bingo games are played, the smart card is updated and the player may receive player points for game play or cash/vouchers for game wins. Player tracking information and voucher information may be stored on the smart card and communicated back to the central bingo system 423. The player can reload the portable card device with additional bingo cards as needed. In addition, when the player does not already have a portable card device, the player may sign up for a portable card device where the bingo cards are purchased (e.g. cashier 417).

Using the portable card, device a player may also have one or more bingo progressive jackpots being played for which are tracked and managed on the smart card. This would allow a player to build the value of their own bingo progressive, which they are playing to win based upon bingo game play. As bingo game play continues, the value of the bingo progressive prize they are playing for increases. When a specific trigger occurs, such as a certain bingo card combination, the bingo progressive prize may be won and credited to the player account.

In the bingo parlor 418, a player may play other games besides bingo at the game terminal 421. For instance, a customer may wish to purchase a predefined set of electronic pull-tabs. In an electronic pull-tab, a player may reveal covered symbols in columns and rows displayed in the pull-tab game. The symbols that are revealed allow the player to determine whether an award was obtained. The pull-tabs may be purchased at the cashier 417 and may be placed on the portable card device to be played in one of the electronic player devices which allows the user to play the pull-tab game such as the game terminal 421. All player points associated with the pull-tab purchases and the results of the pull-tab game play may be collected and stored on the portable card device. All pull-tab wins may also be stored on the portable card device and may be redeemable at a redemption center. The pull-tab game play and bingo game play using the portable card device is not limited to the bingo parlor and may be extended to other venues such casinos, stores and restaurants. In addition, other electronic games, as approved by a given gaming jurisdiction may be used with the portable card device. These venues and their associated gaming devices may include interfaces that are compatible with the line-of-sight communication interfaces and/or photonic power sources described with respect to FIGS. 1-6.

After playing at the casino 405 and the bingo parlor 418, a player may enter the restaurant 404 and play a keno game or a lotto game. The player may purchase keno game plays and lotto game plays from a cashier terminal 441 connected to the keno game terminal 443 and lotto game terminal 444 by a LAN 442. The keno game plays and lotto game plays may be downloaded to the player's portable card device. At the keno game terminal 443 and at the lotto game terminals 444 located at a table where the player may be eating, the player may use their portable card device at the terminals to play the lotto games and keno games stored on the card. Within a keno or lotto environment a certain set of numbers are drawn with the player attempting to match those numbers, the portable card device may contain sets of lucky numbers and associated game types the player wishes to use each time the player plays. In this manner, the player need only establish the set of numbers one time. Further, as described above, the portable card device may execute applications allowing the player to store cash vouchers awarded from keno game play or lotto game play and accumulate loyalty points on the smart card from keno game play and lotto game play.

After using the portable card device at the casino 405, the bingo parlor 418, the restaurant 404, the play may go to the store with their portable card device. At the store 436, the player may purchase gift items at the cashier 438 and engage in game play at the gaming machine 437. Using the portable card device, the player may accumulate loyalty points based on their purchases and game play. In addition, the player may use vouchers stored on the portable card device for game play or purchases. In another example, the player may win a progressive jackpot on the gaming machine 437 based upon progressive game information stored on the portable card device from game play at one or more venues.

Although the foregoing present invention has been described in detail by way of illustration and example for purposes of clarity and understanding, it will be recognized that the above described present invention may be embodied in numerous other specific variations and embodiments without departing from the spirit or essential characteristics of the present invention. Certain changes and modifications may be practiced, and it is understood that the present invention is not to be limited by the foregoing details, but rather is to be defined by the scope of the appended claims.

What is claimed is:

1. A method of operating a gaming system, the method comprising:

generating, by a controller, a plurality of games, each game including game play between two or more different players;

determining, by the controller, whether one or more of the plurality of games is available for play at a first gaming device of a plurality of gaming devices by:

a) selecting, by the controller, a first game from among the plurality of games, b) selecting, by the controller, a second gaming device from among a first group of gaming devices currently granted access to the first game, c) determining, by the controller, first location information associated with the first gaming device and second location information associated with the second gaming device, d) based upon the first location information and the second location information, determining, by the controller, whether the first game is available for play at the first gaming device, and e) repeating b), c) and d), for each of the first group of gaming devices currently granted access to the first game; and sending, via a network interface, a message to the first gaming device including information regarding one or more of the plurality of games available for play at the first gaming device.

2. The method of claim 1, further comprising:

receiving, by the network interface, from the first gaming device, a selection of a second game from the plurality of games available for play at the first gaming device; and granting, by the controller, access to the second game at the first gaming device in response to receiving the selection of the second game.

3. The method of claim 1, further comprising:

determining, by the controller, a number of gaming devices in the plurality of gaming devices from which the first game is being played;

determining, by the controller, a location associated with each of the number of gaming devices on a map of the gaming establishment for each of the number of gaming devices; and displaying, via a video display, the map of the gaming establishment including an indicator of the location associated with each of the number of gaming devices and information associated with parameters of the first game.

4. The method of claim 1, further comprising determining, by the controller, a first location of the first gaming device relative to locations of one or more other gaming devices of the plurality of gaming devices.

5. The method of claim 1, further comprising continuously updating, by the controller, a list of the plurality of games available for play at the first gaming device or the second gaming device.

6. The method of claim 1, wherein the first gaming device is a mobile gaming device and further comprising:

determining, by the controller, a first location of the first gaming device; and determining, by the controller, a first number of games available for play at the first location.

7. The method of claim 6, further comprising:

determining, by the controller, whether the first gaming device is at a second location different from the first location; and determining, by the controller, a second number of games different from the number of games available for play at the first location.

8. The method of claim 1, wherein the first gaming device is a mobile device granted access by at least one server to provide play of a second game while the first gaming device is proximate to a first location, and the method further comprises:

determining, by the controller, that the first gaming device is moved from the first location; and determining, by the controller, whether to terminate access to the second game from the mobile gaming device in response to the determination that the first gaming device is moved.

9. The method of claim 1, wherein one or more of the plurality of gaming devices is configured for simultaneous play of two or more of the plurality of games.

10. The method of claim 1, wherein one or more of the plurality of gaming devices is configured for simultaneous play of one of the plurality of games including game play between two or more different players and a wager-based game involving only a single player.

11. The method of claim 1, wherein one or more of the plurality of games is associated with a tournament.

12. The method of claim 1, wherein each gaming device includes an acceptor configured to accept a physical item associated with a monetary value, a validator configured to identify the received physical item, and a cashout button that is actuatable to cause the gaming device to initiate a payout associated with a credit balance.

13. A non-transitory computer readable medium with computer-executable instructions embodied thereon that, when executed by a controller, cause the controller to:

generate a plurality of games, each game including game play between two or more different players;

determine whether one or more of the plurality of games is available for play at a first gaming device of a plurality of gaming devices by:

a) selecting a first game from among the plurality of games, b) selecting a second gaming device from among a first group of gaming devices currently granted access to the first game, c) determining first location information associated with the first gaming device and second location information associated with the second gaming device, d) based upon the first location information and the second location information, determining whether the first game is available for play at the first gaming device, and e) repeating b), c) and d), for each of the first group of gaming devices currently granted access to the first game; and send, via a network interface, a message to the first gaming device including information regarding one or more of the plurality of games available for play at the first gaming device.

14. The non-transitory computer readable medium of claim 13, further comprising instructions that cause the controller to:

receive, by the network interface, from the first gaming device, a selection of a second game from the plurality of games available for play at the first gaming device; and grant access to the second game at the first gaming device in response to receiving the selection of the second game.

15. The non-transitory computer readable medium of claim 13, further comprising instructions that cause the controller to:

determine a number of gaming devices in the plurality of gaming devices from which the first game is being played;

determine a location associated with each of the number of gaming devices on a map of the gaming establishment for each of the number of gaming devices; and cause a video display to display the map of the gaming establishment including an indicator of the location associated with each of the number of gaming devices and information associated with parameters of the first game.

16. The non-transitory computer readable medium of claim 13, further comprising instructions that cause the controller to:

determine, based on the first location information and the second location information, a distance between the first gaming device and the second gaming device; and based upon the distance between the first gaming device and the second gaming device, determine whether the game is available for play on the first gaming device.

17. The non-transitory computer readable medium of claim 13, further comprising instructions that cause the controller to determine a first location of the first gaming device relative to locations of one or more other gaming devices of the plurality of gaming devices.

18. The non-transitory computer readable medium of claim 13, further comprising instructions that cause the controller to continuously update a list of the plurality of games available for play at the first gaming device or the second gaming device.

19. The non-transitory computer readable medium of claim 13, wherein the first gaming device is a mobile gaming device and further comprising instructions that cause the controller to:

determine a first location of the first gaming device; and determine a first number of games available for play at the first location.

20. The non-transitory computer readable medium of claim 19, further comprising instructions that cause the controller to:

determine whether the first gaming device is at a second location different from the first location; and determine a second number of games different from the number of games available for play at the first location.

21. The non-transitory computer readable medium of claim 13, wherein the first gaming device is a mobile device granted access by the at least one server to provide play of a second game while the first gaming device is proximate to a first location, and the media further comprises instructions that cause the controller:

determine that the first gaming device is moved from the first location; and determine whether to terminate access to the second game from the mobile gaming device in response to the determination that the first gaming device is moved.

22. The non-transitory computer readable medium of claim 13, wherein one or more of the plurality of gaming devices is configured for simultaneous play of two or more of the plurality of games.

23. The non-transitory computer readable medium of claim 13, wherein one or more of the plurality of gaming devices is configured for simultaneous play of one of the plurality of games including game play between two or more different players and a wager-based game involving only a single player.

24. The non-transitory computer readable medium of claim 13, wherein one or more of the plurality of games is associated with a tournament.

25. The non-transitory computer readable medium of claim 13, wherein each gaming device includes an acceptor configured to accept a physical item associated with a monetary value, a validator configured to identify the received physical item, and a cashout button that is actuatable to cause the gaming device to initiate a payout associated with a credit balance.

26. A gaming system comprising:

at least one server;

a network interface for communicating with a plurality of gaming devices; and a controller coupled to the network interface, the controller and the interface configured to:

1) generate a plurality of games, each game including game play between two or more different players;

2) determine whether one or more of the plurality of games is available for play at a first gaming device in the plurality of gaming devices by:

a) selecting a first game from among the plurality of games, b) selecting a second gaming device from among a first group of gaming devices currently granted access to the first game, c) determining first location information associated with the first gaming device and second location information associated with the second gaming device, d) based upon the first location information and the second location information, determining whether the first game is available for play at the first gaming device, and e) repeating b), c) and d), for each of the first group of gaming devices currently granted access to the first game; and 3) send a message to the first gaming device including information regarding one or more of the plurality of games available for play at the first gaming device.

27. The gaming system of claim 26, wherein each gaming device includes an acceptor configured to accept a physical item associated with a monetary value, a validator configured to identify the received physical item, and a cashout button that is actuatable to cause the gaming device to initiate a payout associated with a credit balance.

* * * * *